US010316180B2

(12) United States Patent
Yu et al.

(10) Patent No.: US 10,316,180 B2
(45) Date of Patent: Jun. 11, 2019

(54) COVALENT AND SUPRAMOLECULAR POLYMERS

(71) Applicant: Northwestern University, Evanston, IL (US)

(72) Inventors: Zhilin Yu, Evanston, IL (US); Samuel I. Stupp, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/278,610

(22) Filed: Sep. 28, 2016

(65) Prior Publication Data

US 2017/0088706 A1 Mar. 30, 2017

Related U.S. Application Data

(60) Provisional application No. 62/233,854, filed on Sep. 28, 2015.

(51) Int. Cl.
| | |
|---|---|
| *C08L 61/00* | (2006.01) |
| *C08G 12/00* | (2006.01) |
| *C08L 61/22* | (2006.01) |
| *C08L 77/04* | (2006.01) |
| *C08G 12/08* | (2006.01) |
| *C08G 12/46* | (2006.01) |
| *C08G 69/10* | (2006.01) |
| *C08G 69/36* | (2006.01) |

(52) U.S. Cl.
CPC .............. *C08L 61/22* (2013.01); *C08G 12/08* (2013.01); *C08G 12/46* (2013.01); *C08G 69/10* (2013.01); *C08G 69/36* (2013.01); *C08L 77/04* (2013.01)

(58) Field of Classification Search
None
See application file for complete search history.

(56) References Cited

U.S. PATENT DOCUMENTS

2013/0109805 A1* 5/2013 Shenhar ................. C08G 81/00
524/612

OTHER PUBLICATIONS

Aida et al., Functional Supramolecular Polymers. Science. Feb. 17, 2012;335(6070):813-7.
Andersen, Rattle: A "Velocity" Version of the Shake Algorithm for Molecular Dynamics Calculations. J. Comp. Phys. 1983;52:24-34.
Carnall et al., Mechanosensitive Self-Replication Driven by Self-Organization. SScience. Mar. 19, 2010;327(5972):1502-6.
Cui et al., Amino Acid Sequence in Constitutionally Isomeric Tetrapeptide Amphiphiles Dictates Architecture of—Dimensional Nanostructures. J Am Chem Soc. Sep. 3, 2014;136(35):12461-8.
Cui et al., Self-Assembly of Giant Peptide Nanobelts. Nano Lett. Mar. 2009;9(3):945-51.
Darden et al., Particle mesh Ewald: An N•log(N) method for Ewald sums in large systems. J. Chem. Phys. 1993;98:10089-92.
Dos Remedios et al., Actin Binding Proteins: Regulation of Cytoskeletal Microfilaments. Physiol Rev. Apr. 2003;83(2):433-73.
Feller et al., Constant pressure molecular dynamics simulation: The Langevin piston method. J. Chem. Phys. 1995, 103:4613-4621.
Fukino et al., Manipulation of Discrete Nanostructures by Selective Modulation of Noncovalent Forces. Science. May 2, 2014;344(6183):499-504.
Godoy-Alcántar et al., Structure-stability correlations for imine formation in aqueous solution. J. Phys. Org. Chem. 2005;18:979-985.
Guichard et al., Synthetic foldamers. Chem Commun (Camb). Jun. 7, 2011;47(21):5933-41.
Hartgerink et al., Self-assembly and mineralization of peptide-amphiphile nanofibers. Science. Nov. 23, 2001;294(5547):1684-8.
Hill et al., A Field Guide to Foldamers. Chem Rev. Dec. 2001;101(12):3893-4012.
Hirst et al., Biocatalytic induction of supramolecular order. Nat Chem. Dec. 2010;2(12):1089-94.
Hsu et al., Peptide Amphiphile Nanofibers withConjugated Polydiacetylene Backbones in Their Core. J Am Chem Soc. Mar. 26, 2008;130(12):3892-9.
Huang et al., Pulsating Tubules from Noncovalent Macrocycles. Science. Sep. 21, 2012;337(6101):1521-6.
Jiang et al., Structurally Defined Nanoscale Sheets from Self-Assembly of Collagen-Mimetic Peptides. J Am Chem Soc. Mar. 19, 2014;136(11):4300-8.
Jin et al., Controlled Self-Assembly Triggered by Olefin Metathesis: Cross-Linked Graphitic Nanotubes from an Amphiphilic Hexa-peri-hexabenzocoronene. J Am Chem Soc. Jun. 15, 2005;127(23):8284-5.
Kale et al., NAMD2: Greater Scalability for Parallel Molecular Dynamics. J. Comp. Phys. 1999;151:283-312.
Kumar et al., Novel hyperbranched polymer based on urea linkages. Chem. Commun. 1998, 1629-30.
Lee et al., Atomistic molecular dynamics simulations of peptide amphiphile self-assembly into cylindrical nanofibers. J Am Chem Soc. Mar. 16, 2011;133(10):3677-83.
Mackerell et al., All-atom empirical potential for molecular modeling and dynamics studies of proteins. J Phys Chem B. Apr. 30, 1998;102(18):3586-616.
Martyna et al., Constant pressure molecular dynamics algorithms. J. Chem. Phys. 1994;101:4177-89.
Prince et al., Cooperative Conformational Transitions in Phenylene Ethynylene Oligomers: Chain-Length Dependence. J. Am. Chem. Soc. 1999;121:3114-3121.
Prince et al., Twist Sense Bias Induced by Chiral Side Chains in Helically Folded Oligomers. Angew Chem Int Ed Engl. Jan. 2000;39(1):228-230.
Ridley et al., The small GTP-binding protein rho regulates the assembly of focal adhesions and actin stress fibers in response to growth factors. Cell. Aug. 7, 1992;70(3):389-99.
Sada et al., Post-polymerization of preorganized assemblies for creating shape-controlled functional materials. Chem Soc Rev. Feb. 2007;36(2):415-35.

(Continued)

*Primary Examiner* — Ana L. Woodward
(74) *Attorney, Agent, or Firm* — Casimir Jones SC; David W. Staple

(57) ABSTRACT

Provided herein are compositions comprising covalent and supramolecular polymers, and methods of preparation and use thereof.

2 Claims, 20 Drawing Sheets

(56) References Cited

OTHER PUBLICATIONS

Silva et al., Selective Differentiation of Neural Progenitor Cells by High-Epitope Density Nanofibers. Science. Feb. 27, 2004;303(5662):1352-5.
Sonnino et al., A photoreactive derivative of radiolabeled GM1 ganglioside: preparation and use to establish the involvement of specific proteins in GM1 uptake by human fibroblasts in culture. Biochemistry. Jan. 10, 1989;28(1):77-84.
Stupp et al., Supramolecular materials: Self-organized nanostructures. Science. Apr. 18, 1997;276(5311):384-9.
Stupp et al., Synthesis of Two-Dimensional Polymers. Science. Jan. 1, 1993;259(5091):59-63.
Yu et al., Simultaneous covalent and noncovalent hybrid polymerizations. Science. Jan. 29, 2016;351(6272):497-502.
Zhao et al., Nucleation-elongation polymerization under imbalanced stoichiometry. J Am Chem Soc. Dec. 31, 2003;125(52):16294-9.

\* cited by examiner

COVALENT AND SUPRAMOLECULAR POLYMERS

CROSS-REFERENCE TO RELATED APPLICATIONS

The present invention claims the priority benefit of U.S. Provisional Patent Application 62/233,854, filed Sep. 28, 2015, which is incorporated by reference in its entirety.

STATEMENT REGARDING FEDERAL FUNDING

This invention was made with government support under DE-SC0001059 (renewed as DE-FG02-00ER45810) awarded by the Department of Energy; and DMR1006713 (renewed as DMR1508731) awarded by the National Science Foundation. The government has certain rights in the invention.

FIELD

Provided herein are compositions comprising covalent and supramolecular polymers, and methods of preparation and use thereof.

BACKGROUND

The well-known varieties of soft materials include, for example, covalent polymers, small molecule crystals or glasses, gels, and liquid crystals. There has been rising interest in supramolecular soft matter, defined here to encompass organic materials in which structural units engage in strong and often complex non-covalent interactions to generate interesting properties and functions. Structurally, these materials can be organized nanostructures (ref. 1; herein incorporated by reference in its entirety) or supramolecular polymers (ref. 2; herein incorporated by reference in its entirety). In a functional context, an early example is that of a supramolecular peptide nanofiber that induced rapid and selective differentiation of neural stem cells into neurons (ref. 3; herein incorporated by reference in its entirety). Two interesting recent examples are pulsating tubules driven by changes in temperature (ref. 4; herein incorporated by reference in its entirety) and nanotubes inspired by biological systems. In cytoskeleton fibers, for example, the monomers are covalent polymers and it is their reversible non-covalent interactions into a supramolecular polymer that that assemble and disassemble reversibly due to electrostatics (ref. 5; incorporated by reference in its entirety). Supramolecular soft matter has obvious potential to create remarkable dynamic functions in cells (refs. 6,7; herein incorporated by reference in their entireties). There has been great progress on the design of supramolecular architectures in solution using monomer structure (refs. 8,9; herein incorporated by reference in their entireties), covalent templates (ref. 10; herein incorporated by reference in its entirety), or catalysts (ref. 11; herein incorporated by reference in its entirety).

SUMMARY

In some embodiments, provided herein are compositions comprising both covalent polymers and supramolecular polymers. In some embodiments, the covalent polymer comprises dialdehyde monomers and/or a diamine monomers. In some embodiments, the covalent polymer is a copolymer of the dialdehyde monomers and the diamine monomers. In some embodiments, the dialdehyde monomers and/or a diamine monomers comprise valine (V) and/or glutamic acid (E) amino acids. In some embodiments, the dialdehyde monomers and/or a diamine monomers comprise VEVE. In some embodiments, the covalent polymer comprises a copolymer of:

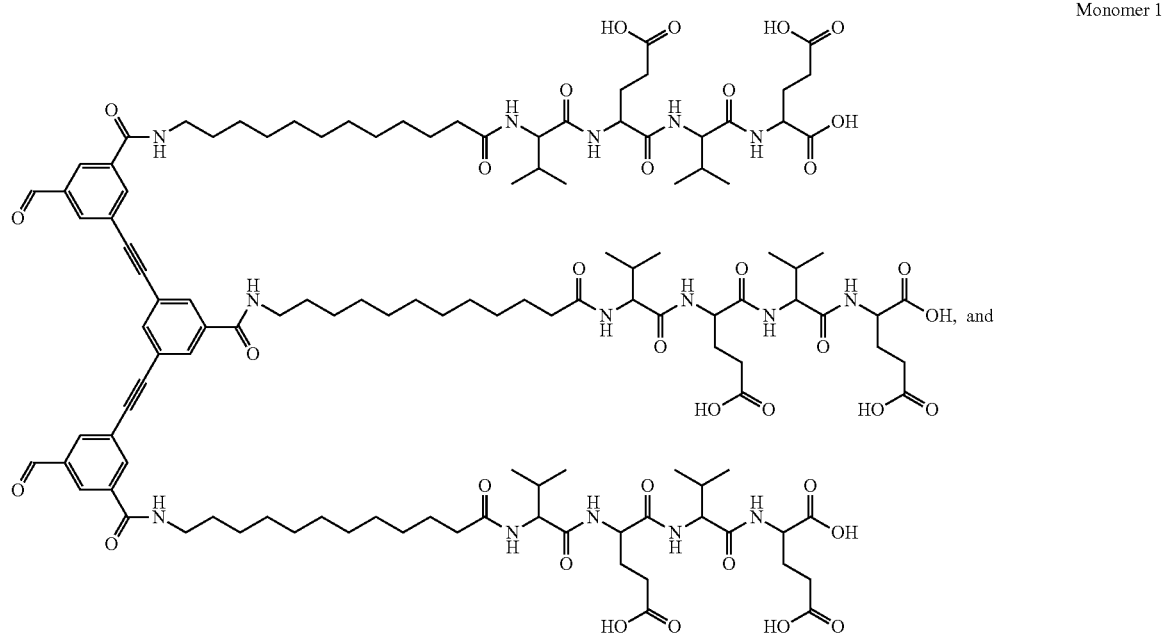

Monomer 1

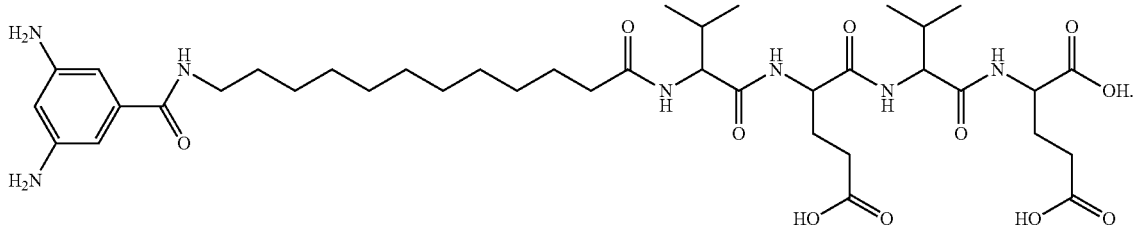

Monomer 2

In some embodiments, the supramolecular polymers comprise a alkyl chain and a peptide group. In some embodiments, the alkyl chain comprises 4 to 20 carbons (e.g., 2, 3, 4, 5, 6, 7, 8, 9, 10, 11, 12, 13, 14, 15, 16, 17, 18, 19, 20, or ranges there between). In some embodiments, the peptide group comprises valine (V) and/or glutamic acid (E) amino acids. In some embodiments, the peptide group comprises VEVE. In some embodiments, the supramolecular polymer comprises a homopolymer of Monomer 3:

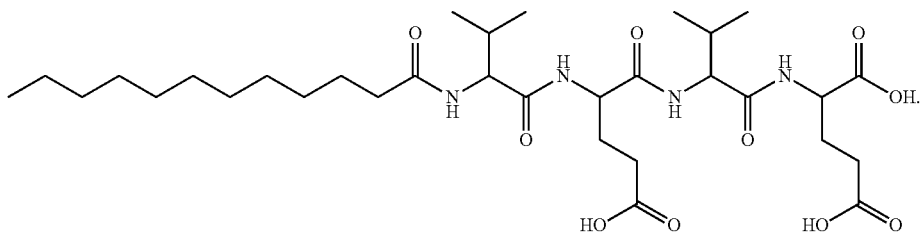 [SMILES: CCCCCCCCCCCC(=O)NC(C(=O)NC(CCC(=O)O)C(=O)NC(C(=O)NC(CCC(=O)O)C(=O)O)C(C)C)C(C)C]

In some embodiments, provided herein are methods of preparing the hybrid compositions described herein.

DEFINITIONS

As used herein, the term "polymer" refers to molecule, macromolecule, or complex comprising a series of molecular monomers linked together end-to-end. When a polymer is of a single type of monomer species, it is referred to herein as a homopolymer. When a polymer comprises two or more different monomer species, it is referred to herein as a copolymer.

As used herein, the term "supramolecular polymer" refers to a polymer comprising monomer units that are held together by noncovalent bonds. Non-covalent forces that hold supramolecular polymers together include coordination, π-π interactions, and hydrogen bonding. Supramolecular polymers may also be referred to as non-covalent polymers.

As used herein, the term "covalent polymer" refers to a polymer comprising monomer units that are held together by covalent bonds.

As used herein, the term "hybrid polymer material" refers to a material comprising both covalent and non-covalent polymers.

DETAILED DESCRIPTION

Covalent and supramolecular polymers are two distinct forms of soft matter, composed of long chains of covalently and non-covalently linked structural units, respectively. Provided herein is a hybrid system formed by simultaneous covalent and supramolecular polymerizations of monomers. In some embodiments, the process yields cylindrical fibers of uniform diameter containing covalent and supramolecular compartments, a morphology that is not observed when the two polymers are formed independently. The covalent polymer has a rigid aromatic imine backbone with helicoidal conformation and its alkylated peptide side chains are structurally identical to the monomer molecules of supramolecular polymers. In the hybrid system, covalent chains grow to higher average molar mass relative to the same polymerization in the absence of a supramolecular compartment. The supramolecular compartments can be reversibly removed and re-formed to reconstitute the hybrid structure, indicating soft materials with special delivery and/or repair functions.

Figure 1:
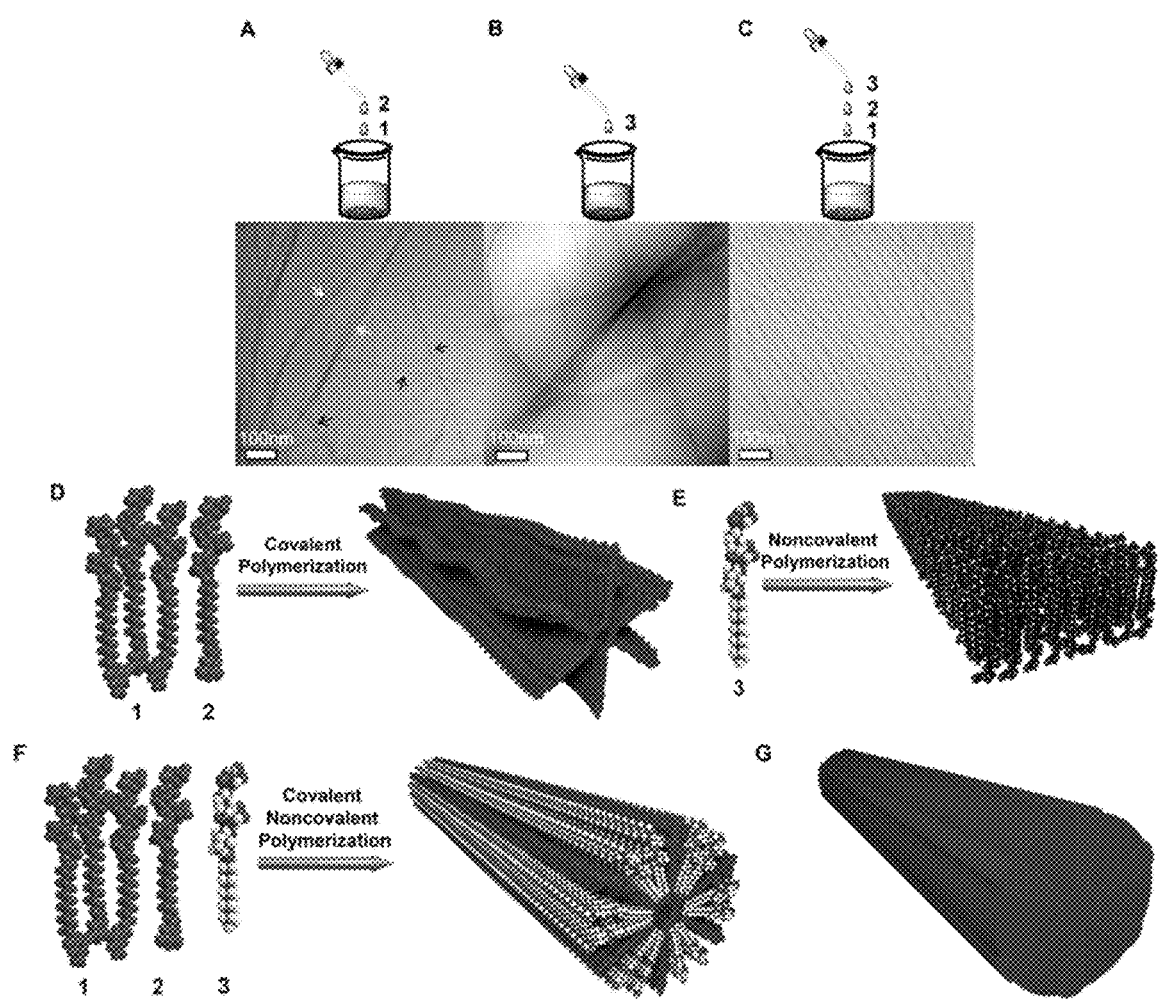
FIG. 1. Hybrid covalent-noncovalent (CNC) polymers. (A to C) Cryo-TEM images for (A) the covalent polymer (C-Polymer) obtained by mixing monomers 1 and 2 in a 1:1 molar ratio at pH 5, (B) the supramolecular polymer (S-Polymer) formed by monomer 3, and (C) the CNC hybrid polymer obtained by simultaneously mixing monomers 1, 2, and 3 in a molar ratio of 1:1:2 at pH 5. (D to F) Molecular graphics illustration of the covalent polymerization of monomers 1 and 2 (D), the supramolecular polymerization of monomer 3 (E), and the simultaneous covalent and supramolecular polymerizations that yield the hybrid polymer (F). (G) Schematic representation of the CNC hybrid polymer consisting of two distinct covalent and supramolecular compartments.

Provided herein is the synthesis of polymeric systems based on the simultaneous covalent and non-covalent polymerization of structurally matched monomers. Experiments were conducted to develop hybrid structures that form during a synergistic process. In exemplary embodiments, the covalent polymer ("C-polymer") was designed to form by condensation reactions between an aromatic dialdehyde (monomer 1) and an aromatic diamine (monomer 2). The two monomers comprise side chains the amino acid sequence valine-glutamic acid-valine-glutamic acid (VEVE), connected to the aromatic groups via a dodecyl linkage (see Table 1). An exemplary monomer of the supramolecular polymer (S-polymer) is monomer 3, with side chains that are isostructural with the side chains of the C-polymer, and was expected to form ribbon-shaped supramolecular polymers (ref. 12; herein incorporated by reference in its entirety). The C-Polymer was designed to have a helicoidal conformation (refs. 13,14; herein incorporated by reference in their entireties), and in some embodiments to promote (e.g., in polar media) and stabilize hydrogen bonds among the peptide segments and π-π stacking interactions between aromatic groups. To synthesize the C-polymer, monomers 1 and 2 were mixed in a 1:1 molar ratio in aqueous solution at pH 5 in order to promote the condensation reaction between aldehydes and amines (ref. 15; herein incorporated by reference in its entirety). The S-Polymer was formed by dissolving monomer 3 in water, given its strong amphiphilic structure. Cryo-transmission electron microscopy (TEM) revealed the formation of a heterogeneous collection of one-dimensional structures in the C-polymer, and the S-Polymer formed the expected ribbon-shaped flat assemblies (see FIG. 1A-C). Mixing solutions of monomers 1, 2, and 3 simultaneously in a molar ratio of 1:1:2 at pH 5, the flat assemblies of the S-Polymer did not form and instead one-dimensional structures were observed with precisely defined cylindrical shape with uniform diameter.

TABLE 1

Chemical structures of monomers 1, 2, and 3.

| Monomers | Chemical Structures |
|---|---|
| Monomer 1 | 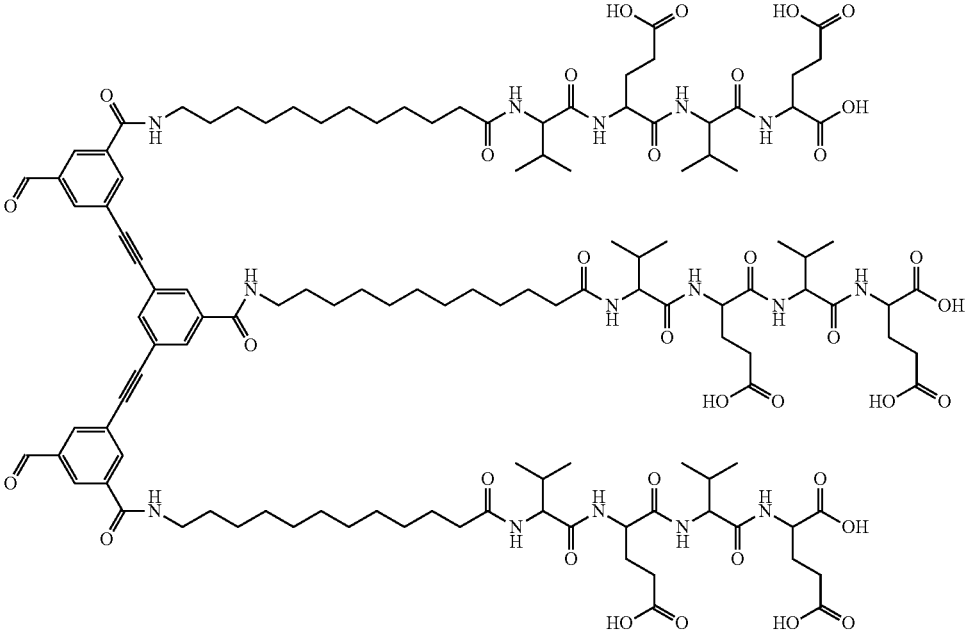 [SMILES: CC(C)C(NC(=O)CCCCCCCCCCCNC(=O)c1cc(C#Cc2cc(C=O)cc(C(=O)NCCCCCCCCCCCC(=O)NC(C(=O)NC(CCC(=O)O)C(=O)NC(C(=O)NC(CCC(=O)O)C(=O)O)C(C)C)C(C)C)c2)cc(C#Cc2cc(C=O)cc(C(=O)NCCCCCCCCCCCC(=O)NC(C(=O)NC(CCC(=O)O)C(=O)NC(C(=O)NC(CCC(=O)O)C(=O)O)C(C)C)C(C)C)c2)c1)C(=O)NC(CCC(=O)O)C(=O)NC(C(=O)NC(CCC(=O)O)C(=O)O)C(C)C] |
| Monomer 2 | 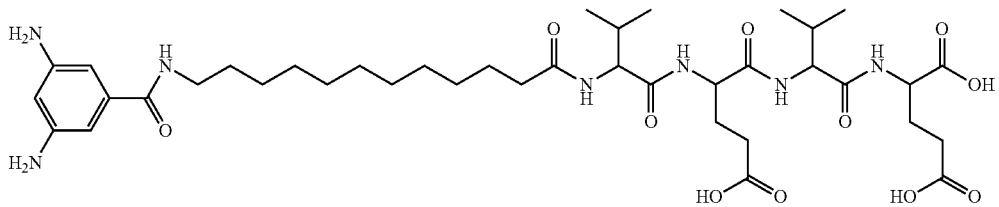 [SMILES: CC(C)C(NC(=O)CCCCCCCCCCCNC(=O)c1cc(N)cc(N)c1)C(=O)NC(CCC(=O)O)C(=O)NC(C(=O)NC(CCC(=O)O)C(=O)O)C(C)C] |
| Monomer 3 | 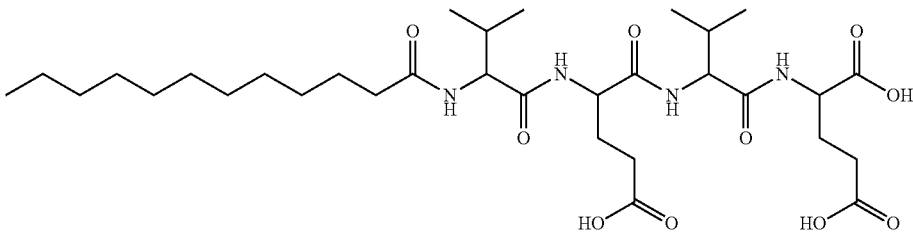 [SMILES: CCCCCCCCCCCC(=O)NC(C(=O)NC(CCC(=O)O)C(=O)NC(C(=O)NC(CCC(=O)O)C(=O)O)C(C)C)C(C)C] |

Experiments were conducted during development of embodiments of the present invention to demonstrate that that a covalent-noncovalent (CNC) hybrid system forms by the simultaneous covalent and supramolecular polymerizations. In some embodiments, the CNC hybrid integrates distinct covalent and supramolecular compartments as a result of the structural match of the respective monomers (see FIG. 1D-F). In addition, only a homogeneous cylindrical structure was observed, indicating thorough integration of both polymers. Mechanistically, it is contemplated that the preference for helical conformation in the C-Polymer and common structural features in all three monomers provides directional nucleation and growth of supramolecular compartments to create a cylindrical hybrid structure; although the present invention is not limited to any particular mechanism of action and an understanding of the mechanism of action is not necessary to practice the present invention.

Figure 2:
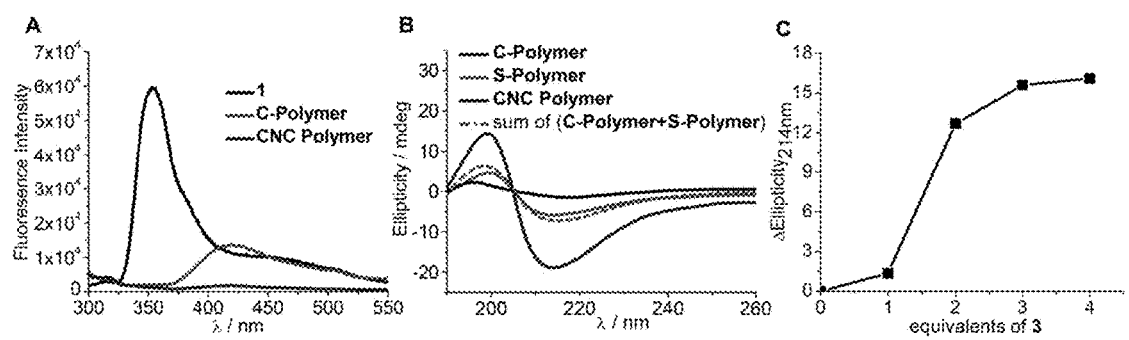
FIG. 2. Spectroscopic characterization. (A) Fluorescence spectra of monomer 1, the C-Polymer, and the CNC hybrid polymer. (B) Circular dichroism (CD) spectra of the C-Polymer, the S-Polymer, the CNC hybrid polymer, and the sum of the spectra of the C-polymer and S-polymer. (C) Plot of the difference in CD signal intensity at 214 nm corresponding to the mixture of all three monomers (1, 2, and 3) and that of monomer 3 (Aellipticity=CD intensity (mixture)–CD intensity (monomer 3)) as a function of the equivalents of monomer 3 added. All samples were prepared at pH 5.
Figure 10:
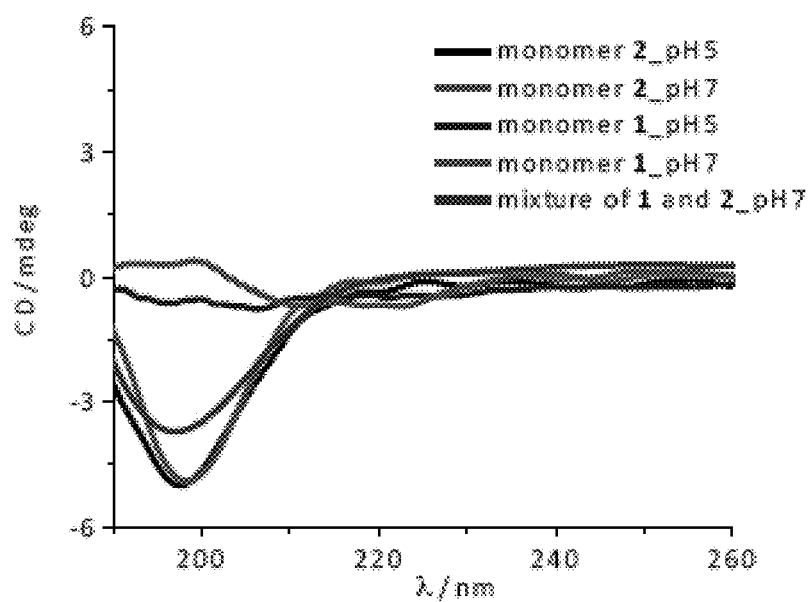
FIG. 10. CD spectra of the individual monomers 1 and 2 at pH 5 and 7 and their mixture at pH 7.
Figure 11:
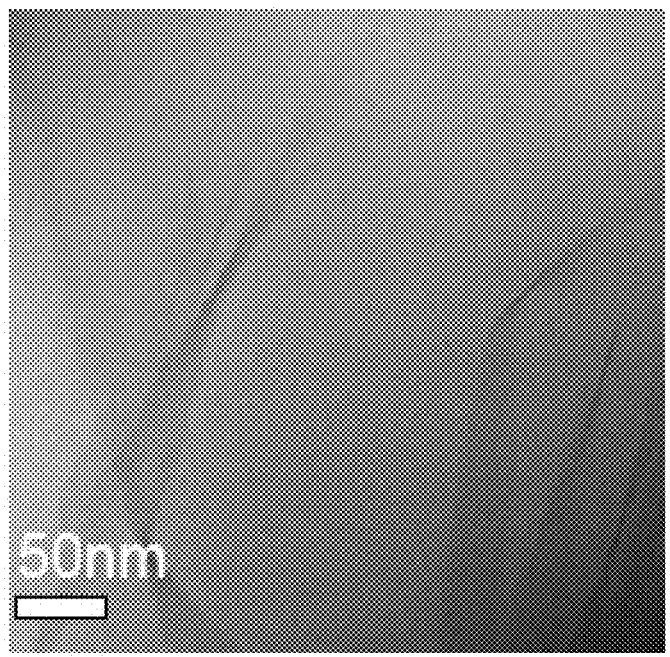
FIG. 11. Cryo-TEM image for monomer 2 shows twisted ribbons with approximately 150 nm width.

Condensation between monomers 1 and 2 to form the C-Polymer was monitored by optical spectroscopy. A 1:1 molar ratio of monomers 1 and 2 in a fresh solution at pH 5, which favors formation of imine bonds for polymerization, yields a product revealing in its fluorescence spectrum the expected excimer emission appearing instantaneously at 430 nm compared to 358 nm for monomer 1 (FIG. 2A). This shift indicates the existence of strong π-π stacking interactions in the folded backbone of the C-Polymer (ref. 16; herein incorporated by reference in its entirety). Immediately upon mixing monomers 1, 2, and 3, significant quenching of the excimer emission characteristic of the C-Polymer was observed. This observation indicates that the covalent polymerization of monomers 1 and 2 within the hybrid was facilitated by the simultaneous polymerizations (FIG. 2A). The typical CD signals for β-sheet secondary structure in the peptide side chains were observed in the mixture of monomers 1 and 2 (FIG. 2B), while only CD signals corresponding to random coil conformation were observed for the individual monomers (FIG. 10). These results indicate that attachment of the peptide to the C-polymer backbone as a side chain the folded enhances formation of the β-sheets. These hydrogen bonds can in turn facilitate the growth of the folded backbone by pre-organizing monomers. In addition, the absence of a CD signal in the absorption region of the folded backbone (around 300 nm) indicates that the chiral centers in peptide segments are too distant or the dodecyl linkers are too flexible to bias the twist sense of the helical backbone (ref. 18; herein incorporated by reference in its entirety). When solutions of monomers 1, 2, and 3 were mixed simultaneously, the CD signal for β-sheets increased more relative to the C- or S-Polymer and the signal intensity was even greater than the sum of both (FIG. 2B). This significant increase indicates formation of a highly ordered hybrid structure in which peptide hydrogen bonding is enhanced due to synergistic interactions among the three isostructural monomers. The observed increase in CD intensity is dependent on the relative concentrations of monomers 1 and 2 versus monomer 3. A saturation of the signal is in fact observed beyond the addition of two equivalents of monomer 3 (FIG. 2C). Only a finite number of monomer 3 molecules are incorporated into the hybrid structure to create the supramolecular compartments, consistent with its well-defined shape and uniform diameter.

Figure 3:
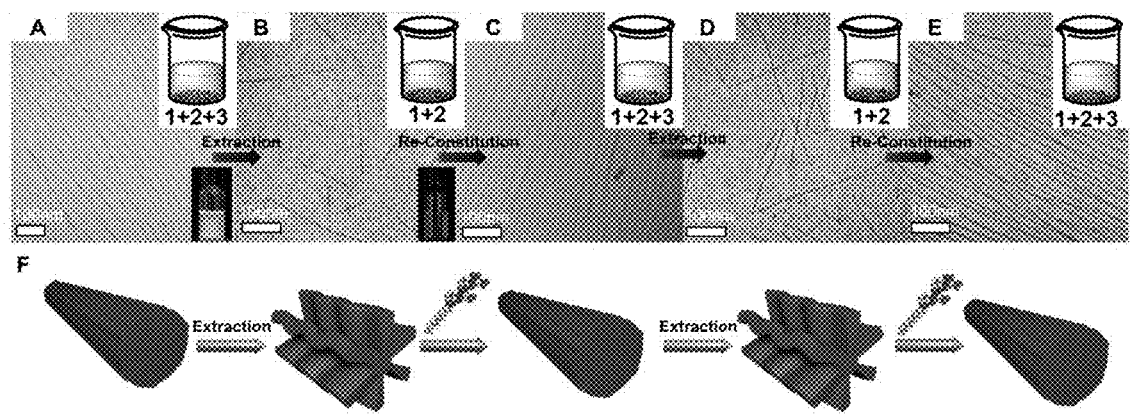
FIG. 3. (A to C) Cryo-TEM image of the CNC hybrid polymer (A), the same material following extraction of the supramolecular compartments by dialysis (B), and following reconstitution of the hybrid by adding a fresh solution of monomer 3 (C). D and E show images corresponding to samples exposed to a second cycle of extraction and reconstitution. (F) Schematic representation of the extraction of supramolecular compartments from CNC hybrid polymers and their reconstitution by adding monomer 3.
Figure 17:
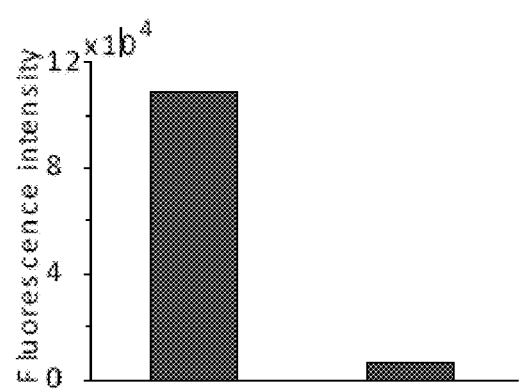
FIG. 17. Fluorescence intensity of fl-3 before and after extraction from the hybrid CNC polymers.

Experiments were conducted during development of embodiments of the present invention to remove the supramolecular compartment from the hybrid CNC polymer and subsequently reconstituting it. For this purpose a fluorescein-labeled version of monomer 3 (fl-3) was synthesized to quantify this process. Cryo-TEM experiments showed that extraction of monomer 3 from the hybrid by dilution in pH 5 water and dialysis led to the appearance of short fibers (FIG. 3B). Remarkably we found that upon addition of fresh monomer 3 to the extracted sample the long cylindrical morphology of the CNC hybrid was recovered (FIG. 3A-C). In fact, if the extraction and reconstitution cycle is repeated, identical results were obtained (see FIGS. 3D and E). Based on the fluorescence intensity of fl-3 in the polymer solution, 94% of monomer 3 was removed from the hybrid after dilution and dialysis (FIG. 17).

Figure 7:
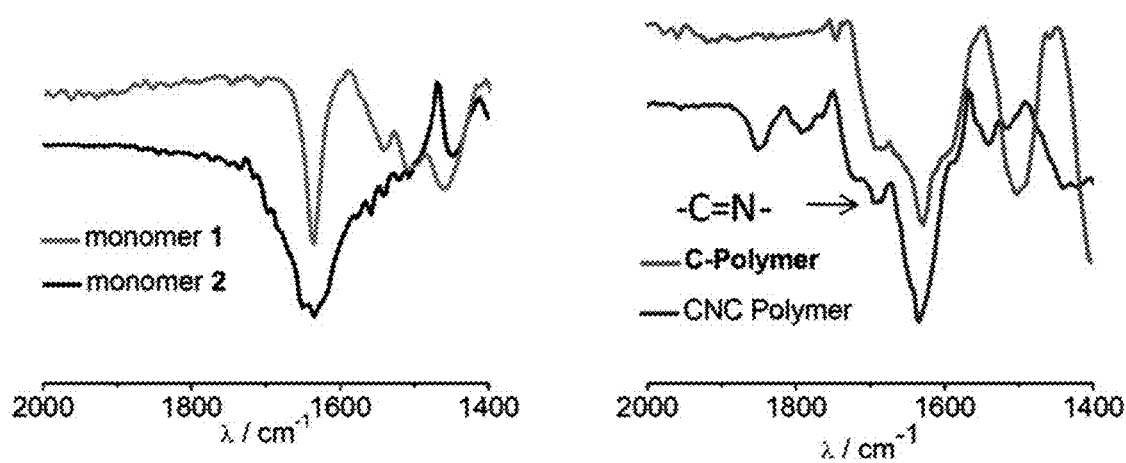
FIG. 7. FT-IR spectra of monomers 1 and 2 (left), the C-polymer and the hybrid CNC polymer (right) at pH 5. The absorption peaks corresponding to the imine bonds were only observed in the spectra of the C-polymer and the hybrid CNC polymers.
Figure 8:
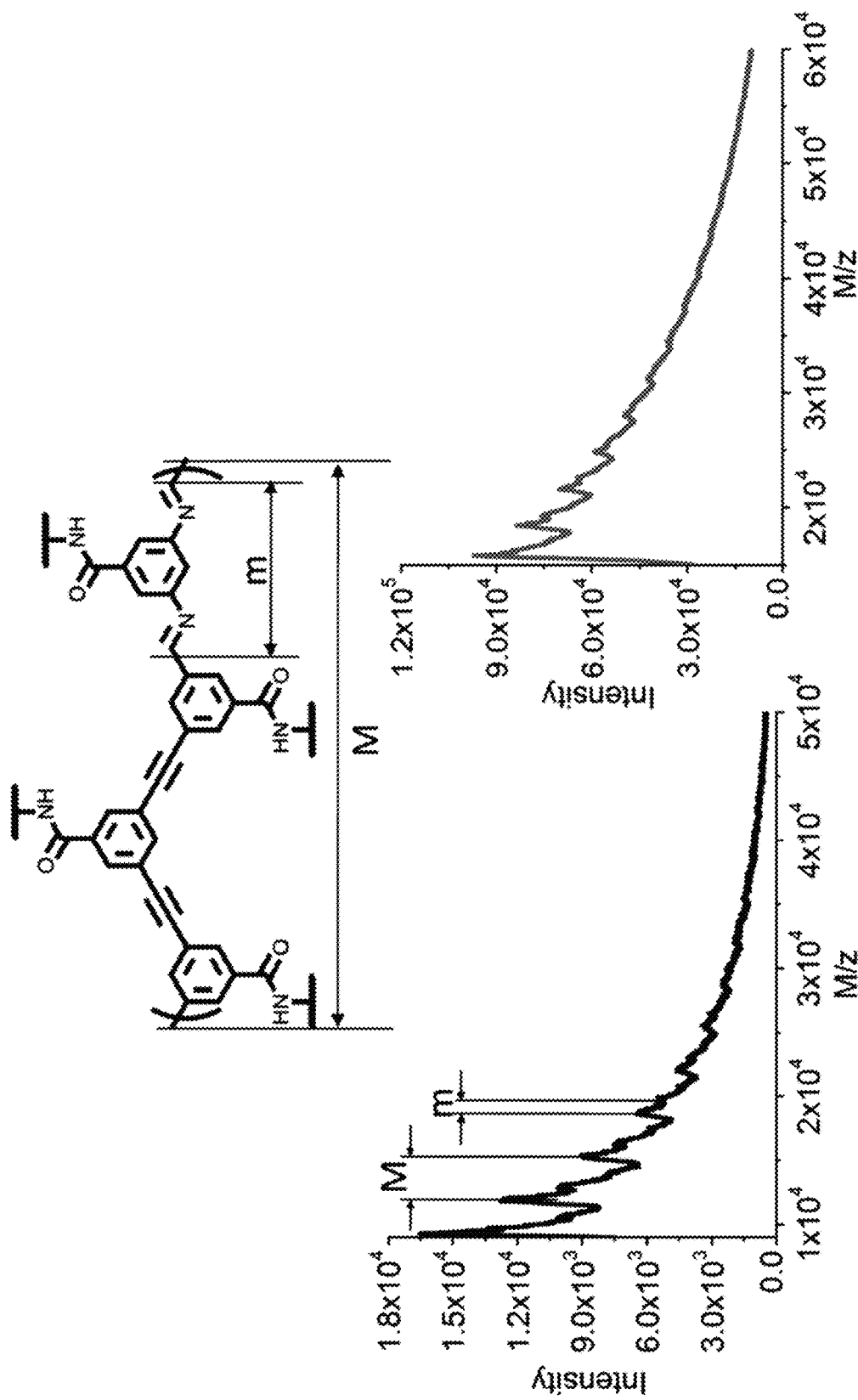
FIG. 8. MALDI-TOF spectra of the C-Polymer formed by the condensation reaction between monomers 1 and 2 (left) and the covalent compartment in the CNC hybrids obtained from the simultaneous polymerization from monomers 1, 2, and 3 (right). The mass unit of around ca. 3197 Da, which represents the repeat unit, appears up to the mass of 40 kDa. The shoulder peak along the mass increase direction corresponds to the fragment of the diamine monomer 2 used in this polymerization.
Figure 9:
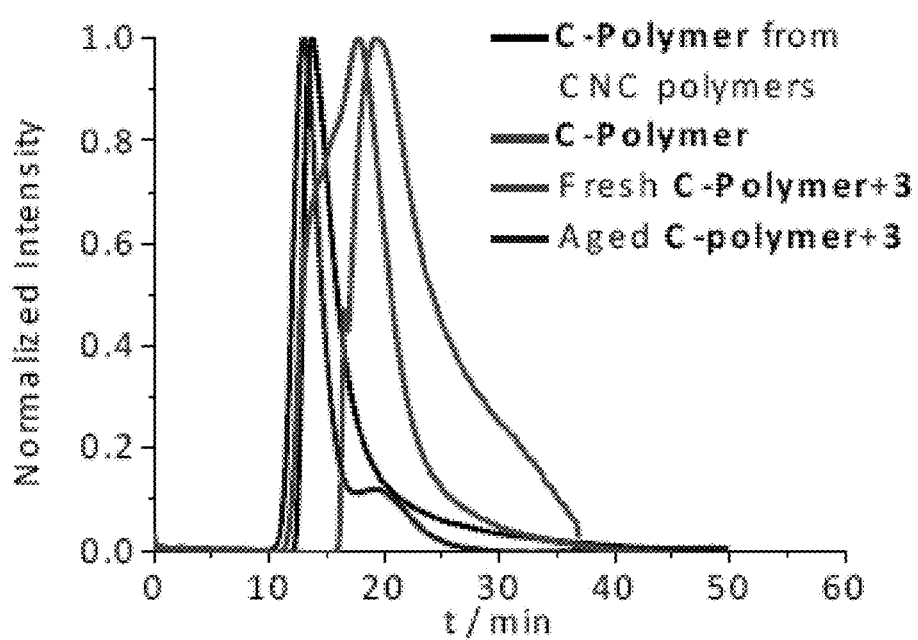
FIG. 9. SEC-MALS traces of the C-Polymer and the covalent compartment in the CNC hybrids, as well as the covalent polymers in the fresh or aged mixture of the pre-formed C-Polymer and monomer 3.

In order to verify covalent polymerization in both the C-Polymer and the CNC hybrid, Fourier transform infrared spectroscopy (FT-IR), matrix-assisted laser desorption ionization-time of flight (MALDI-TOF) mass spectrometry, and size exclusion chromatography with multi-angle light scattering (SEC-MALS) was used. The FT-IR measurements provided clear evidence of imine bond formation in both the C-Polymer and the CNC hybrid (FIG. 7). It was also established through FTIR the presence of hydrogen bonds in all samples (FIG. 7). MALDI-TOF also confirmed the formation of covalent polymer upon mixing monomers 1 and 2 or monomers 1, 2, and 3 as indicated by a significant increase in molar mass in both cases (FIG. 8). The average molecular weight (Mn) when 1 and 2 were mixed was determined by SEC-MALS to be on the order of 14 kDa. On the other hand, a much higher molecular weight of 250 kDa was measured by this technique for the covalent component of the CNC hybrid (FIG. 9 and Table 2). These results demonstrate the formation of a covalent polymer by mixing monomers 1 and 2 or within the hybrid structure. Furthermore, the results also strongly support a mechanism by which formation of the supramolecular compartment in the hybrid effectively "catalyzes" covalent polymerization; although, the present invention is not limited to any particular mechanism of action and an understanding of the mechanism of action is not necessary to practice the present invention.

TABLE 2

Molecular weight and polydispersity index of the covalent polymers prepared under different conditions.

|  | C-Polymer | covalent compartment in the CNC hybrids | covalent polymers in the fresh mixture of the preformed C-Polymer + 3 | covalent polymers in the aged mixture of the preformed C-Polymer + 3 |
|---|---|---|---|---|
| $\overline{M}_n$ | 13.9 kDa | 248 kDa | 21.1 kDa | 190 kDa |
| $\overline{M}_w$ | 23.7 kDa | 347.7 kDa | 23.7 kDa | 227 kDa |
| PDI | 1.70 | 1.40 | 1.69 | 1.29 |

Figure 4:
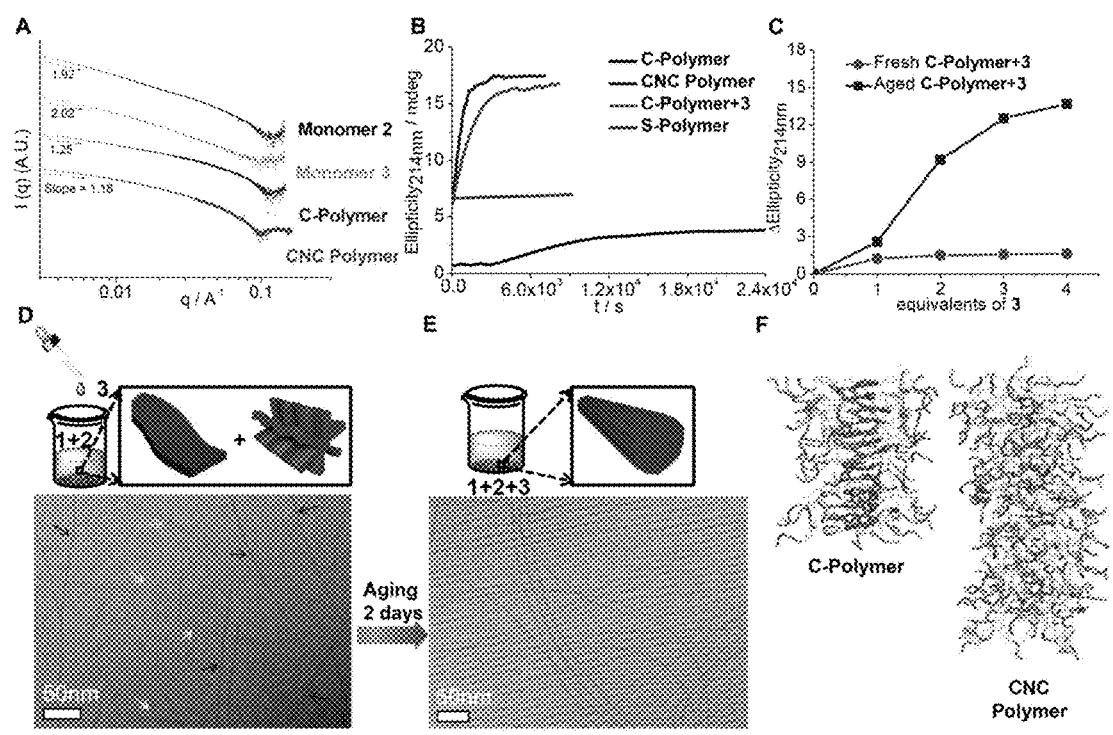
FIG. 4. (A) Small angle X-ray scattering curves and their corresponding slopes in the linear region obtained from solutions of monomer 2, monomer 3, the C-Polymer, and the hybrid CNC polymer (scattering curves were offset for clarity). (B) Change in ellipticity at 214 nm as a function of time during formation of the C-Polymer, S-Polymer, CNC hybrid polymer during simultaneous covalent and supramolecular polymerization (by mixing monomers 1, 2, and 3), and CNC hybrid polymer by adding monomer 3 to a pre-formed C-Polymer. (C) Plot of the difference in circular dichroism (CD) signal intensity at 214 nm corresponding to the mixture of 1 and 2 and that of monomer 3 (Aellipticity=CD intensity (mixture)–CD intensity (monomer 3)) as a function of the added equivalents of monomer 3. The plot shows one curve corresponding to a fresh sample of C-polymer mixed with 3 and another corresponding to an aged sample. Cryo-TEM image of a sample corresponding to a fresh mixture of a pre-formed C-polymer and monomer 3 (D) and a sample of the same mixture aged for 2 days (E) (both samples contained two equivalents of monomer 3). Black and white arrows in (D) indicate cylindrical fibers and ribbons, respectively. (F) Results from an atomistic molecular dynamics modeling of the C-Polymer (right) and the CNC hybrid polymer (left). The dashed ellipsoids indicate formation of hydrogen bonding between peptides in covalent and supramolecular compartments.
Figure 5:
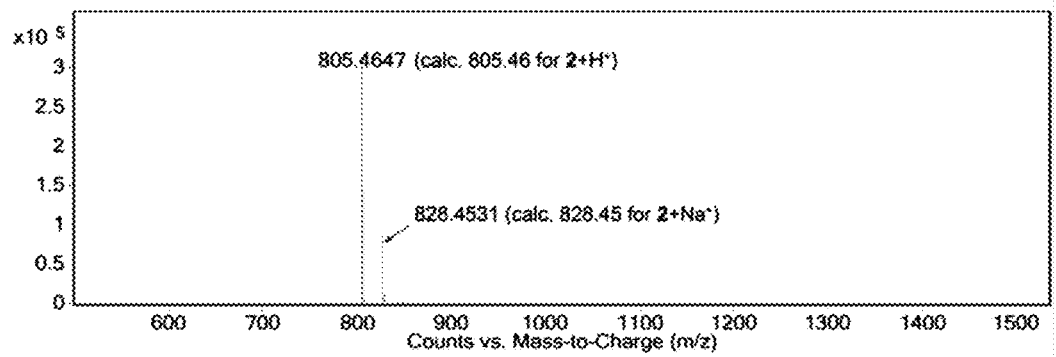
FIG. 5. ESI-mass spectra of monomers 2 (top), 1 (center), and 3 (bottom).
Figure 5:
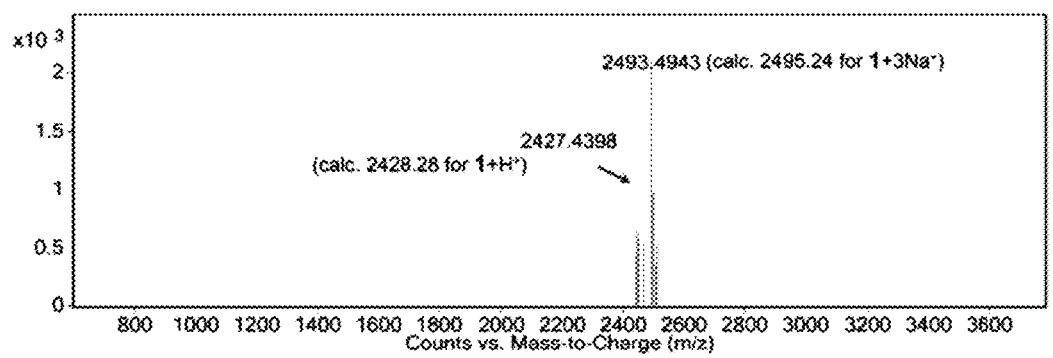
Figure 5:
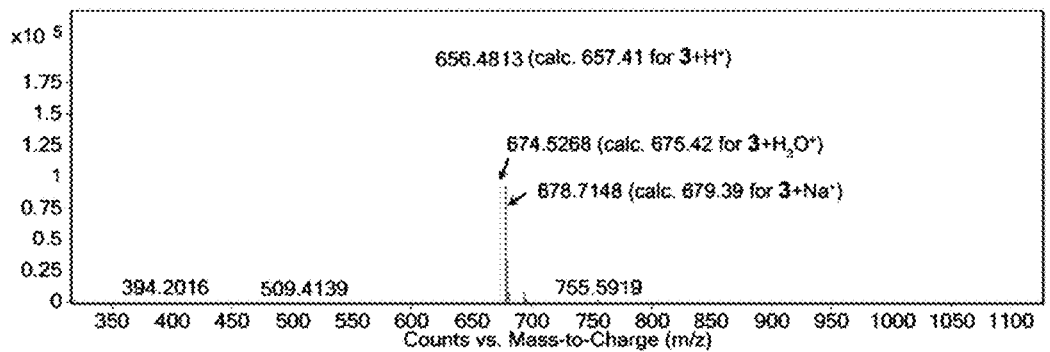
Figure 6:
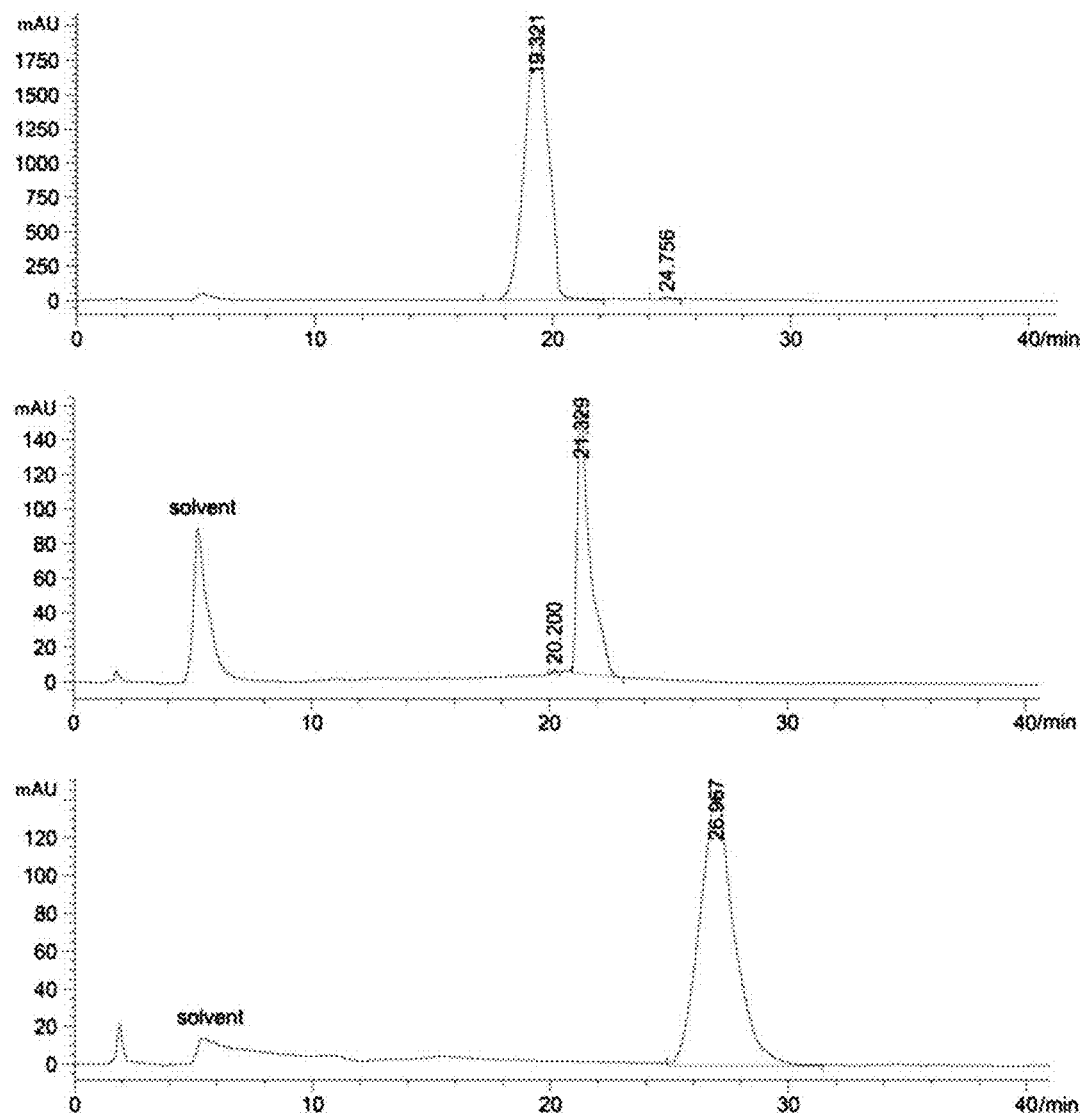
FIG. 6. Analytical HPLC traces of monomers 2 (top), 1 (center), and 3 (bottom).

Small-angle X-ray scattering (SAXS) experiments were used to characterize further the morphologies of the various supramolecular assemblies in solution. For monomers 2 and 3, the scattering signals showed a −2 slope in the low-q area, demonstrating the formation of flat structures in solution (FIG. 4A). The C-Polymer exhibited a −1.25 slope suggesting a heterogeneous mixture of morphologies, which is consistent with our cryo-TEM observations. In contrast, the CNC hybrid displayed a slope very close to −1 (FIG. 4A), indicating the formation of highly one-dimensional cylindrical structures without any evidence of the flat structures observed for monomers 2 and 3. Additional geometrical information of the assemblies of the hybrid were obtained by fitting the scattering curves to a core-shell cylinder model. The diameter for the hybrid was estimated to be 5.9 nm, which is comparable observations by cryo-TEM. These observations provide strong evidence for the formation of a hybrid structure integrating covalent and supramolecular polymers.

In order to gain insight into the mechanism for the formation of the hybrid CNC polymer, changes in the CD spectrum were monitored with time in different types of samples. As shown in FIG. 4B, a mixture of monomers 1 and 2 undergoing covalent polymerization reveals an increasing value of ellipticity that saturates after several hours. In great contrast, the CNC polymer formed by mixing all three monomers simultaneously exhibits a rapid rise in ellipticity suggesting nucleation and growth of an ordered structure. At the same time, the invariant ellipticity of the S-Polymer formed by monomer 3 indicates that the increase in ellipticity of the CNC hybrid does not arise from independent supramolecular polymerization but from the simultaneous supramolecular and covalent polymerizations. The significantly faster kinetics associated with CNC hybrid formation compared to that of the C-Polymer strongly supports a unique mechanism involving simultaneous covalent and supramolecular "reactions". These observations explain why the average molecular weight measured for the covalent compartment of the CNC polymer is so much higher than that of the C-Polymer. That is, the data is consistent with a synergistic enhancement of C-Polymer formation by supramolecular contacts with monomer 3.

CD spectroscopy was used to follow the interaction between a pre-formed C-Polymer and monomer 3. As shown in FIG. 4C, when different amounts of monomer 3 are added to the pre-formed C-Polymer, we only observe a small initial increase in CD signal intensity in the β-sheet region. However, when samples with an excess of monomer 3 are allowed to age for two days, a very significant increase in CD intensity is observed. In fact, this increase is comparable to that observed when the hybrid CNC polymers are formed through the simultaneous mixing of monomers 1, 2, and 3 (FIG. 4C). SEC-MALS indicates that the average molecular weight (Mn) of the covalent component in solutions containing two equivalents of monomer 3 increases with time from 21.1 kDa to 190 kDa (Table 2). The fact that the CD signatures of the ordered hybrid are not observed immediately upon mixing could be explained by diffusional barriers within the system imposed by the pre-formed covalent polymer. Mechanistic probes described above again imply that supramolecular contacts between the isostructural components within the hybrid have a "catalytic" effect on covalent polymerization.

Figure 18:
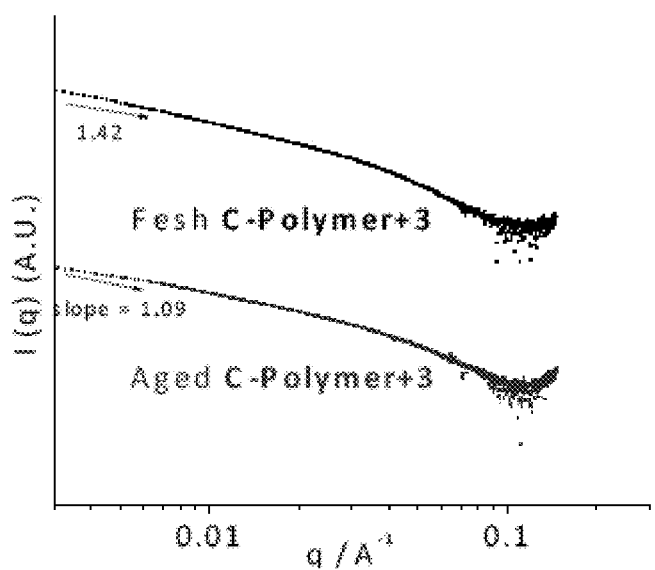
FIG. 18. Scattering profiles of the fresh and aged mixture of the preformed C-Polymer and monomer 3. Scattering intensities were offset for clarity.
Figure 19:
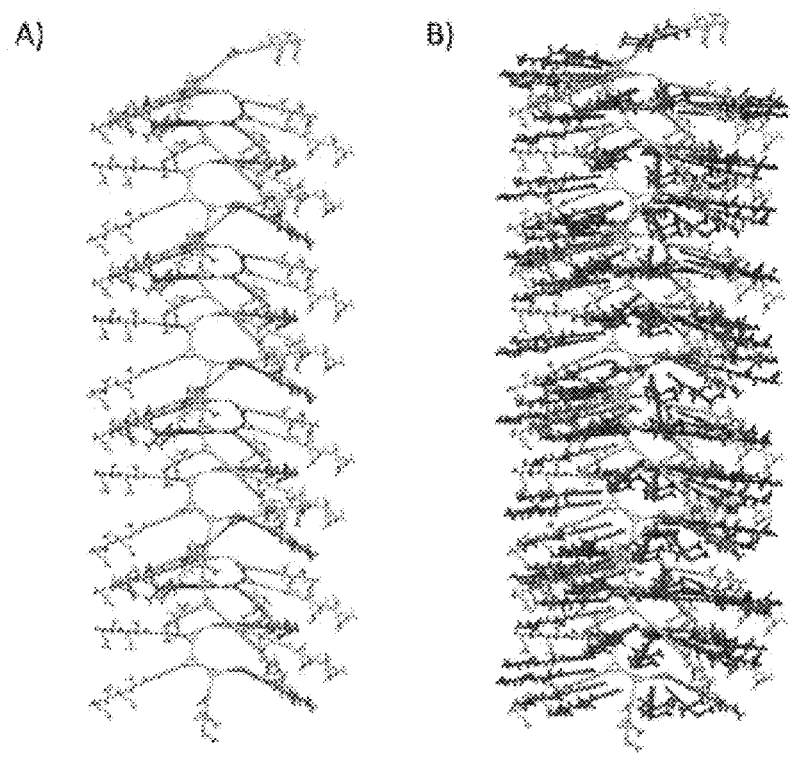
FIG. 19. Initial structure of C-Polymer (a) and hybrid CNC polymer (b) used for MD simulations. Monomers 1, 2, and 3 were labeled in yellow, green, and red, respectively.

Both SAXS and cryo-TEM experiments supported the interpretation of the CD and molecular weight data. In SAXS experiments, the fresh mixture of pre-formed C-Polymer and monomer 3 revealed a slope of −1.4 in the low-q region, indicating a heterogeneous mixture of morphologies. In great contrast, a slope of approximately −1 was measured for the aged sample, thus demonstrating the possibility of forming the well-defined cylindrical structure of the CNC hybrid by mixing monomer 3 with pre-formed covalent polymer. In addition, fitting the scattering data to a core-shell cylindrical model yields effectively the same diameter for structures in the aged sample and samples obtained by the simultaneous polymerization of monomers 1, 2, and 3 (FIG. 18). Furthermore, cryo-TEM also reveals virtually identical morphologies in these two types of samples (FIGS. 4D and E). These results demonstrate that the well-defined hybrid structure can be obtained by simultaneous covalent and noncovalent polymerization or by mixing a pre-formed C-Polymer, which then grows further in molar mass upon addition of the monomeric precursor of the S-Polymer. However, in both cases simultaneous covalent and supramolecular polymerizations occur.

In previous work (refs 19-22; herein incorporated by reference in their entireties), systems have been studied in which covalent polymerization is triggered after supramolecular self-assembly of monomers leading to internally ordered covalent polymers. There is also another system in which an ordered covalent polymer was obtained following polymerization of the monomer in a solvent that does not promote formation of a supramolecular template (ref. 23; herein incorporated by reference in its entirety). Experiments were conducted during development of embodiments of the present invention that demonstrate a synthesis of hybrid polymers in which the supramolecular and covalent polymers are integrated. The supramolecular compartment in these systems can be temporarily removed and reconstituted by simply adding its monomer again. Furthermore, the supramolecular compartment within the hybrid "catalyzes" covalent polymerization.

Figure 20:
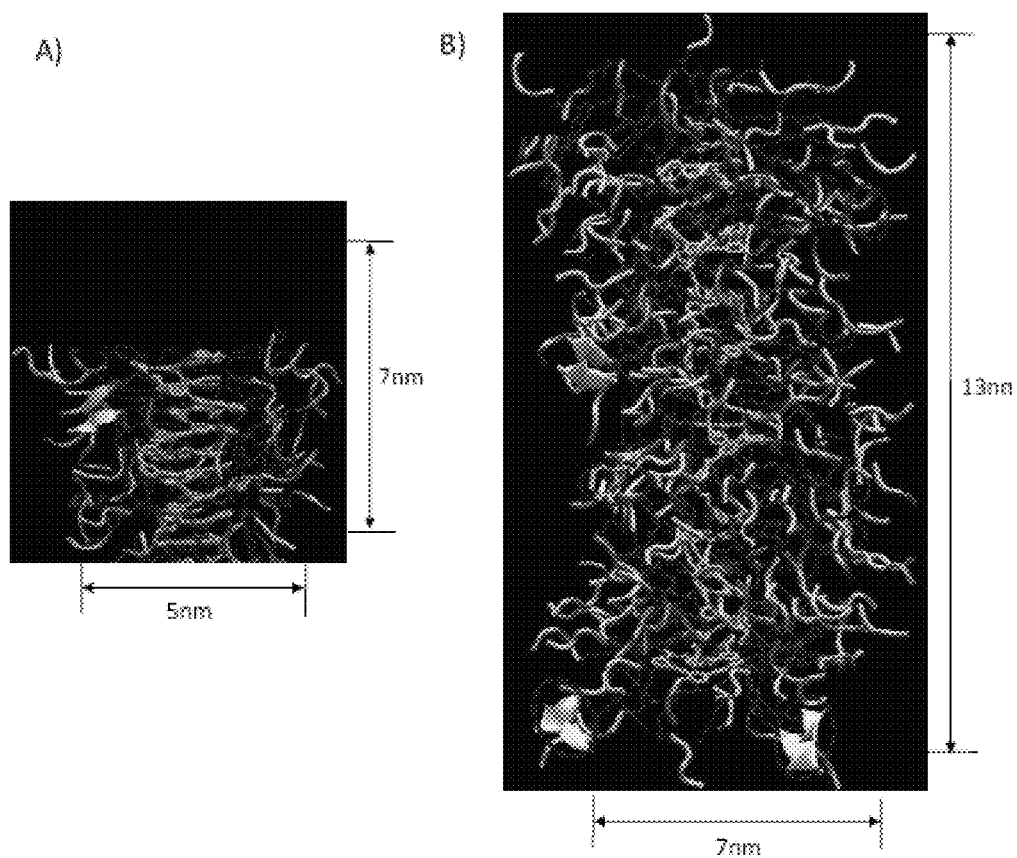
FIG. 20. Representative configurations from MD simulations of (A) the C-Polymer and (B) the hybrid CNC polymer (B).

Atomistic molecular dynamics (MD) simulations were carried out on the C-Polymer and the hybrid CNC polymer (FIG. 4F). These MD simulations were carried out for 24 molecules each of monomers 1 and 2 and 48 molecules of monomer 3 in the presence of water and sodium ions (ref. 24; herein incorporated by reference in its entirety). The simulations yielded a hybrid CNC structure with diameter equal to 7 nm, which is reasonably consistent with experimental results (FIG. 20). The simulations showed also that β-sheets were formed among 15 peptide segments within the C-Polymer and among 22 peptide segments in the hybrid CNC polymer. The simulations demonstrate that most of the β-sheets within the CNC hybrids were formed between the supramolecular and covalent compartments (FIG. 20). The integration of the two distinct compartments into the CNC hybrids benefits from these secondary bonds along with other non-covalent interactions. This integration among isostructural components in all three monomers was in fact an important molecular design criterion.

Experiments were conducted during development of embodiments of the present invention that demonstrate hybrid covalent non-covalent polymers formed through synergistic and simultaneous covalent and supramolecular polymerizations of monomers containing isostructural motifs. These polymers self-organize to contain distinct covalent and supramolecular compartments that allow removal and re-formation of the supramolecular component, thus reconstituting the hybrid polymer. These structures provide functional platforms for novel modes of molecular delivery or repair of structures as hybrids are disassembled and re-formed by simple addition of small molecules. Experiments conducted during development of embodiments of the present invention on these systems also indicate that supramolecular polymerizations can be used to "catalyze" the formation of covalent macromolecules.

In some embodiments, the hybrid polymer materials provided herein comprise covalent and supramolecular compartments. In some embodiments, the covalent and supramolecular compartments partially comprise isostructural segments and form identical hydrogen bonds. In some embodiments, the folding conformation of the covalent compartment constraints and cooperatively stabilizes the surrounding hydrogen bonds. In some embodiments, isostructural features between covalent and supramolecular compartments allow them to integrate rapidly and intensely, leading to homogenous hybrids, which are different with other systems using hetero-templates. In some embodiments, both the covalent and supramolecular compartments exhibit dynamic features, which allow reconstitution of the hybrids. In some embodiments, covalent and supramolecular polymerizations occur simultaneously. In some embodiments, the hybrid polymers are constructed based on self-assembly, rather than complicated engineering means.

The methods of covalent and supramolecular polymer co-synthesis described herein improve the growth of traditional covalent polymers due to, for example, the simultaneity of the occurrence of the involved covalent and non-covalent polymerizations. In some embodiments, the resulting hybrid complexes composed of covalent and supramolecular compartments are reconstituted following their dissociation into small covalent patches by extracting the supramolecular compartments. In some embodiments, the hybrid polymers herein provide materials, systems, and methods for cargo delivery, for example, where the covalent patches behave as the scaffold to uptake and release the supramolecular compartment over multiple cycles.

EXPERIMENTAL

Example 1

Syntheses of Building Blocks for Monomers

Compounds 3-6 were prepared as described in the literature (refs. 25,26; herein incorporated by reference in their entireties). Toluene, diisopropylamine (DIPA), and triethylamine (Et3N) were distilled prior to use under argon atmosphere over sodium and calcium hydride, respectively. Other chemical reagents were commercial and used as received. Deuterated solvents for NMR spectroscopic analyses were purchased from Cambridge Isotope Laboratories and were used as received. Column chromatography was performed on silica gel 60 (Merck 40-60 nm, 230-400 mesh). NMR Spectra were recorded on Varian INOVA-400 at 400 MHz, Varian INOVA-500 at 500 MHz, and Varian INOVA-600 at 600 MHz spectrometers at room temperature using residual protonated solvent signals as internal standard (1H: δ(CHCl3)=7.26 ppm and 13C: δ(CHCl3)=77.16 ppm). Coupling constants (J) are reported in Hertz (Hz). Standard abbreviations indicating multiplicity were used as follows: m=multiplet, t=triplet, d=doublet, s=singlet, br=broad. Electrospray Ionization Mass Spectroscopy (ESI-MS) was performed on a Bruker AmaZon X liquid chromatography-MS (LC-MS) quadrupole ion trap spectrometer.

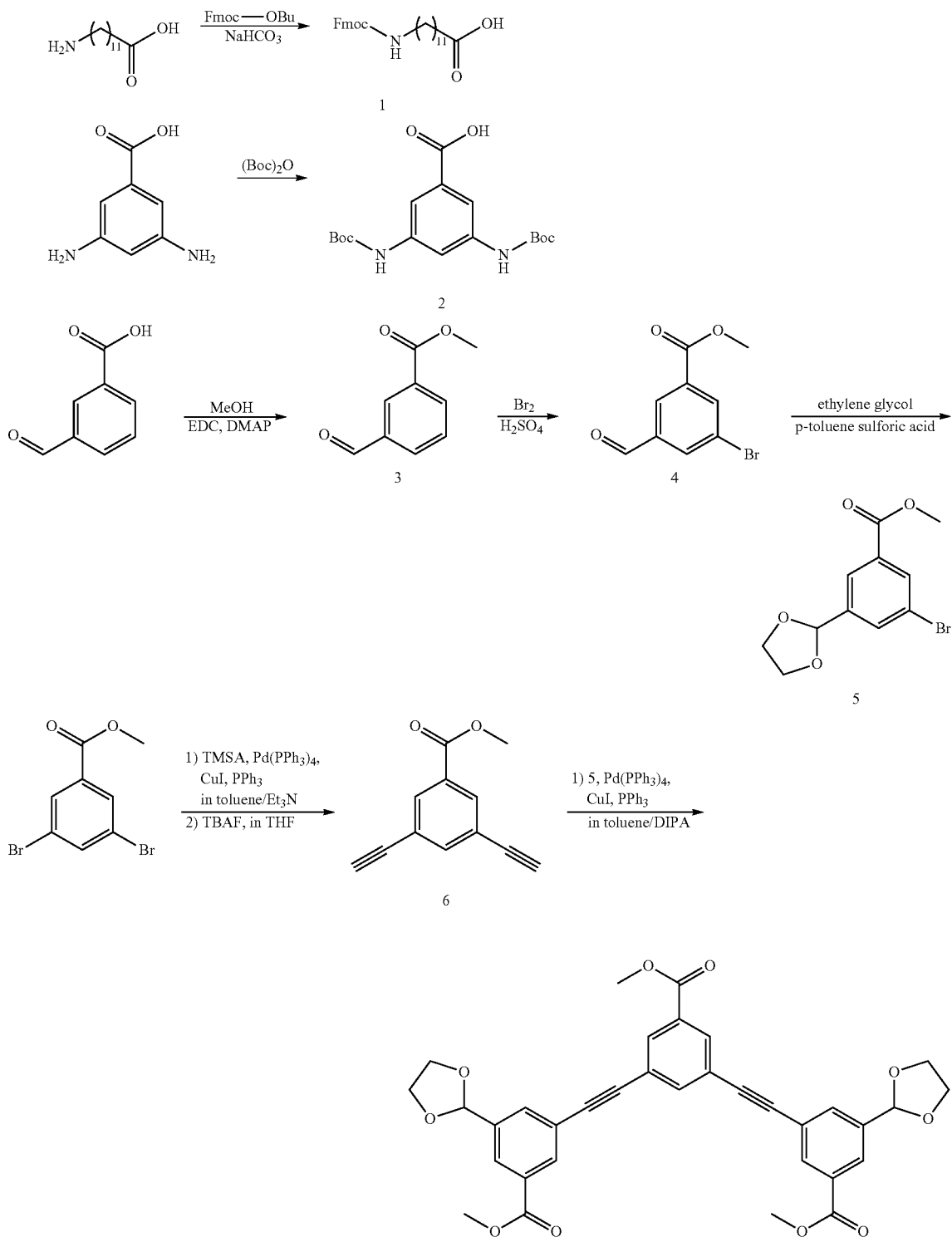

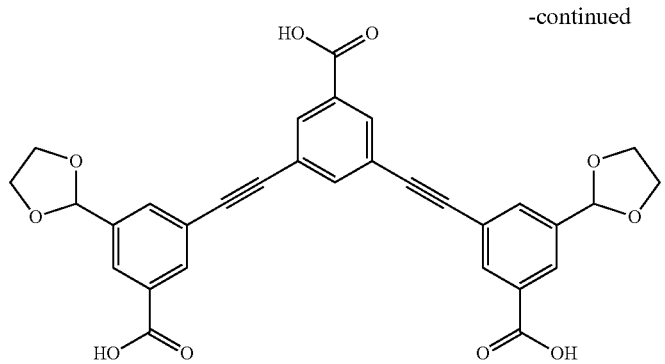

8

Compound 1: 12-(Fmoc-Amino) Dodecanoic Acid
(Ref 27; Herein Incorporated by Reference in its Entirety)

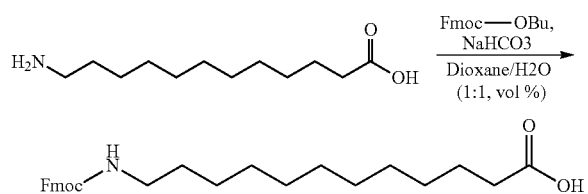

To a mixture of 12-aminododecanoic acid (4.3 g, 20 mmol) and sodium bicarbonate (5.0 g, 60 mmol) in water (50 ml) was added Fmoc-OSu (6.8 g, 20 mmol) in dioxane (50 mL). The reaction mixture stirred vigorously at room temperature over right. After adjusting to pH 4 by addition of HCl (1M) solution, the precipitate was collected by filtration and washed by water continually to gain compound 1 as a white powder (7.3 g, 17 mmol) in 85% yield. In cases where micelles were formed by the sodium salt of compound 1, neutralization by adding aqueous HCl was conducted after dissolving the collected solid in MeOH and dispersing in aqueous MeOH by addition of water. $^1$H-NMR (300 MHz, CDCl3): δ (ppm)=7.78-7.79 (d, 3J=6.5, 2H, Ar—H), 7.61-7.62 (d, 3J=6.5, 2H, Ar—H), 7.40-7.43 (t, 3J=7.5, 2H, Ar—H), 7.32-7.35 (t, 3J=7.5, 2H, Ar—H), 4.42-4.43 (d, 3J=7.0, 2H, C—H), 4.22-4.25 (t, 3J=7.0, 1H, C—H), 3.19-3.22 (dd, 3J=5.5, 2H, C—H), 2.35-2.38 (t, 3J=7.5, 2H, C—H), 1.62-1.68 (m, 2H, C—H), 1.50-1.52 (m, 2H, C—H), 1.30 (s, 15H, C—H). ESI-MS: m/z=438.32 ((M$^+$H)$^+$) (calc. 438.27 for $C_{27}H_{35}NO_4{}^+$H$^+$).

Compound 2: 3,5-Bis((Tert-Butoxycarbonyl)Amino)Benzoic Acid
(Ref. 28; Herein Incorporated by Reference in its Entirety)

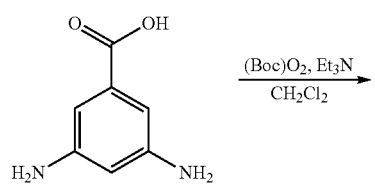

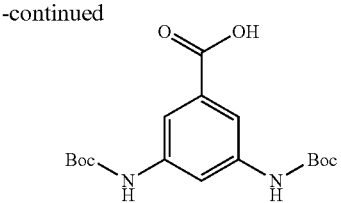

To a mixture of 3, 5-diaminobenzoic acid (3.0 g, 20 mmol) and triethylamine (11 mL, 80 mmol) in dry chloromethane (50 mL) was dropwise added di-tert-butyldicarbonate (9.6 g, 44 mmol) in dry chloromethane (30 mL) at 0° C. After the addition, the reaction mixture was stirred at room temperature over right. The reaction was quenched by addition of saturated aqueous sodium bicarbonate. The mixture was extracted with water and brine (3×50 mL). The organic phase was dried over sodium sulfate and concentrated to furnish compound 2 as a white pound, which was used in the solid-phase synthesis without further purification (776 mg, 2.21 mmol, 64%). $^1$H-NMR (300 MHz, CDCl$_3$): δ (ppm)=7.92 (s, 1H, Ar—H), 7.73 (s, 2H, Ar—H), 1.54 (s, 18H, O—CH$_3$). ESI-MS: m/z=353.22 ((M$^+$H)$^+$) (calc. 353.17 for $C_{17}H_{24}N_2O_6{}^+$H$^+$).

Compound 7

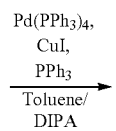

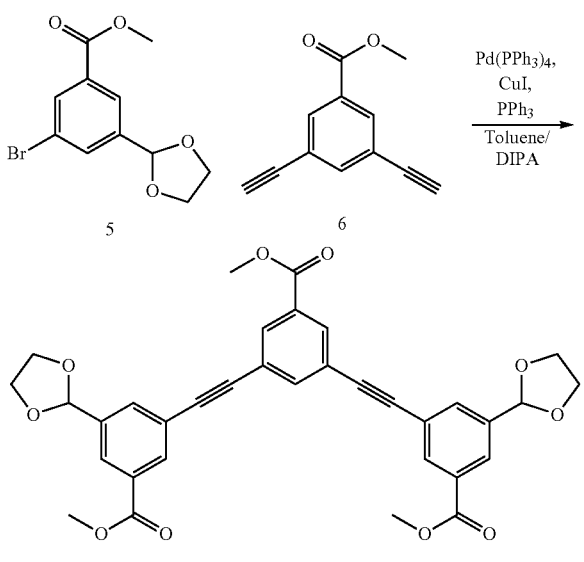

In a dry and degassed flask, a mixture of 5 (1.3 g, 4.5 mmol), 6 (332 mg, 1.8 mmol), Pd(PPh$_3$)$_4$ (42 mg 0.036 mmol), CuI (34 mg, 0.18 mmol), and PPh3 (48 mg, 0.18 mmol) was dissolved in a solvent mixture of DIPA (2 mL), toluene (10 mL), and stirred for 16 h at 80° C., then concentrated under vacuum and purified by silica column chromatography (DCM/methanol=100/1), to obtain compound 7 (440 mg, 0.8 mmol) as a light-yellow solid in 44% yield. 111-NMR (300 MHz, CDCl$_3$): δ (ppm)=8.23-8.24 (t, 3J=1.5, 2H, Ar—H), 8.18-8.20 (t, 3J=1.5, 2 H, Ar—H), 8.15-8.17 (t, 3J=1.5, 2H, Ar—H), 7.88-7.89 (t, 3J=0.9, 1H, Ar—H), 7.86-7.88 (t, 3J=1.5, 2H, Ar—H), 5.89 (s, 2H, C—H), 4.16-4.18 (m, 4H, O—CH), 4.10-4.11 (m, 4H, OCH), 3.97 (s, 9H, —COOCH3). $^{13}$C-NMR (300 MHz, CDCl$_3$): δ (ppm)=165.1, 164.9, 141.4, 133.4, 133.1, 132.4, 132.0, 130.3, 129.8, 128.6, 128.1, 120.8, 120.2, 119.7, 119.2, 106.8, 93.6, 92.4, 86.8, 70.9, 70.7, 62.8, 62.3, 59.2. ESI-MS: m/z=619.32 ((M$^+$Na)$^+$) (calc. 619.16 for C$_{34}$H$_{28}$O$_{10}$$^+$Na$^+$).

Compound 8

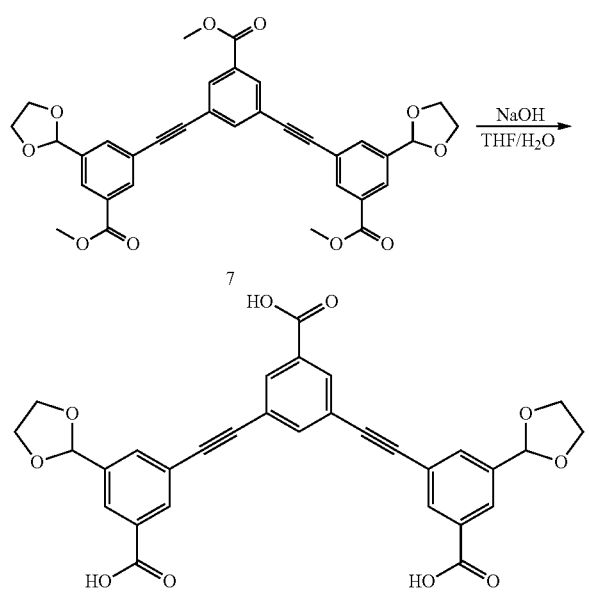

To compound 7 (360 mg, 0.6 mmol) in THF (2 mL) was added NaOH solution (1 N, 10 mL) with vigorous stirring. The reaction mixture was refluxed overnight and became transparent. After cooling down to room temperature, the solution was neutralized by HCl solution (1 M). The solid was collected by filtration to offer compound 8 as a light yellow pound in quantitative yield (330 mg, 0.6 mmol). $^1$H-NMR (300 MHz, CDCl$_3$): δ (ppm)=8.23-8.24 (t, 3J=1.5, 2H, Ar—H), 8.18-8.20 (t, 3J=1.5, 2H, Ar—H), 8.15-8.17 (t, 3J=1.5, 2H, Ar—H), 7.88-7.89 (t, 3J=0.9, 1H, Ar—H), 7.86-7.88 (t, 3J=1.5, 2H, Ar—H), 5.89 (s, 2H, C—H), 4.16-4.18 (m, 4H, O—CH), 4.10-4.11 (m, 4H, OCH). $^{13}$C-NMR (300 MHz, CDCl$_3$): δ (ppm)=165.1, 164.8, 141.5, 133.8, 133.2, 132.8, 132.2, 130.8, 129.9, 128.6, 128.1, 120.8, 120.2, 119.7, 119.2, 106.8, 93.6, 92.4, 86.8, 69.9, 69.7. ESI-MS: m/z=577.16 ((M$^+$Na)$^+$) (calc. 577.11 for C$_{31}$H$_{22}$O$_{10}$$^+$Na$^+$).

Example 2

Synthesis and Purification of the Monomers for Covalent and Non-Covalent Polymerization The monomers for the covalent polymerization, e.g. monomer 1 and monomer 2, as well as the monomer for supramolecular polymerization, e.g. monomer 3, were synthesized using 9-fluorenylmethoxycarbonyl (Fmoc) solid phase peptide synthesis on the 1 mmol scale using Fmoc-Glu(OtBu)-Wang resin. Fmoc deprotections were performed with 30% piperidine-DMF solution for 10 min. Amino acid coupling reactions were carried out using a coupling mixture of amino acid/HBTU/DIEA (4:3.95:6 relative to the resin) in the mixture of DCM/DMF/NMP (N-methylpyrrolidone). Specifically, the coupling between compound 8 and the functionalized resin was catalyzed by PyBOP in a ratio of 1:0.99:2 for 8, PyBOP, and DIEA, and this coupling was repeated three time to complete the reaction with amines on the resin. Cleavage of the peptides from the Wang resin was carried out with a mixture of trifluoroacetic acid (TFA)/triisopropylsilane (TIS)/H2O in a ratio of 95:2.5:2.5 for 3 hours. Excess TFA and scavengers were removed by rotary evaporation. The remaining peptide solution was triturated with cold diethyl ether and the precipitate was centrifuged, and the supernatant liquid was removed by decantation. After washing with diethyl ether (three times) to remove residual TFA, the precipitate was dried under vacuum overnight. The peptides were purified by preparative RP-HPLC using a Phenomenex Gemini column (C18, 10 µm, 100 Å, 30×150 mm) at 25° C. on a Varian Prostar Model 210 preparative HPLC system. Water/acetonitrile gradient containing 0.1 vol % NH$_4$OH was used as an eluent at a flow rate of 25 mL/min. The purified fractions were collected and concentrated by rotary evaporation to remove acetonitrile, then lyophilized and stored at −20° C. The final peptides 1, 2, and 3 were characterized by electrospray ionization mass spectrometry (ESI-MS) using an Agilent 6510 quadrupole time-of-flight (Q-TOF) instrument, with 0.1% NH4OH in a water-acetonitrile mix (70:30) as eluent.

Example 3

Characterization of the Structure and Molecular Weight of the Resulting Dynamer in Various Conditions FT-IR samples were dissolved in water (pH 5, adjusted by HCl—NH4OH) (Millipore filtered, resistivity 18.2 MΩ cm) and placed under the light source. FTIR spectra were collected using a Thermo Nicolet, Nexus 870 FT-IR, baseline corrected using the Omnic FTIR software. MALDI-TOF mass spectra were obtained on Bruker autoflex III (Compass™ 1.4 for Flex-series, Frequency Tripled Nd:YAG laser @ 355 nm with structured focus), employing 2,5-dihydrozybenzoic acid (DHB) (10 mg/mL in water, 1:1 vol % with sample) as the matrix. Size exclusion chromatography (SEC-MALS) was performed under an Agilent 100 Series pump with a Viscotek Visco GEL GPC column using pH5 buffer as the eluent, coupled to a Wyatt DAWN HELEOS-II multi-angle light scattering detector and an OPTILAB rEX refractive index detector. In both MALDI-TOF and SEC-MALS experiments, dissociation of SMs from the dynamer within the hybrid CNC polymers involves a diluting-dialyzing-concentrating process. In a typical process, the solution of the hybrid CNC polymers was diluted 10 folds and dialyzed using membrane with molecular weight cut-off (MWCO)<1 KDa (Spectra/Por, Regenerated Cellulose Dialysis Membrane). The resulting solution was further concentrated by lyophilization.

Example 4

Conformation and Morphology of the Monomers, the Dynamer and the Hybrid CNC Polymers Circular Dichroism was done using a model J-715 Jasco Circular Dichroism Spectrometer. Fluorescence spectroscopy was performed using an ISS PCI Spectroflourometer in an L-configuration. CA solutions (1.15 µM, 2 mL) were measured in 10 mm quartz cuvettes, excited at 500 nm, and fluorescence intensity recorded between 515 and 765 nm. Atomic force microscopy (AFM) was performed using a Parks Systems XE-100 under tapping mode. Samples (4 µL, 115 µM) were drop cast and air-dried on a freshly cleaved mica substrate that had been treated with 300 mM MgCl2 to render the mica surface cationic and promote nanostructure adhesion. Cryogenic transmission electron microscopy (Cryo-TEM) was performed on a JEOL 1230 microscope, operating at 80 kV. A 5.5 µL droplet was placed on a lacey carbon film supported on a TEM copper grid. The grid was held by tweezers mounted on a Vitrobot Mark IV equipped with a controlled humidity and temperature environment. The specimen was blotted and plunged into a liquid ethane reservoir cooled by liquid nitrogen. The vitrified samples were transferred to a Gatan 626 cryo-holder through a cryo-transfer stage cooled by liquid nitrogen. During observation of the vitrified samples, the cryo-holder temperature was maintained below −180° C. The images were recorded with a CCD camera. Conventional TEM was performed on HT7700 Transmission Electron Microscope, operating at 80 kV. The samples were stained by 2 wt % uranyl acetate aqueous solution on the surface of carbon-coated copper grids. Small angle X-ray scattering (SAXS) studies were performed using beam line 5ID-D, in the DuPont-Northwestern-Dow Collaborative Access team (DND-CAT) Synchrotron Research Center at the Advanced Photon Source, Argonne National Laboratory. X-ray energy of 15 keV corresponding to a wavelength of 0.83 Å-1 was selected using a double-crystal monochromator. The data were collected using a CCD detector (MAR) positioned 245 cm behind the sample. The scattering intensity was recorded in the interval 0.000451<q<0.74 Å-1. The wave vector defined as:

$$q=(4\pi/\lambda)\sin(\theta/2)$$

where θ is the scattering angle. Samples were placed in 1.5 mm quartz capillaries. The exposure times were between 2 and 4 seconds.

Figure 12:
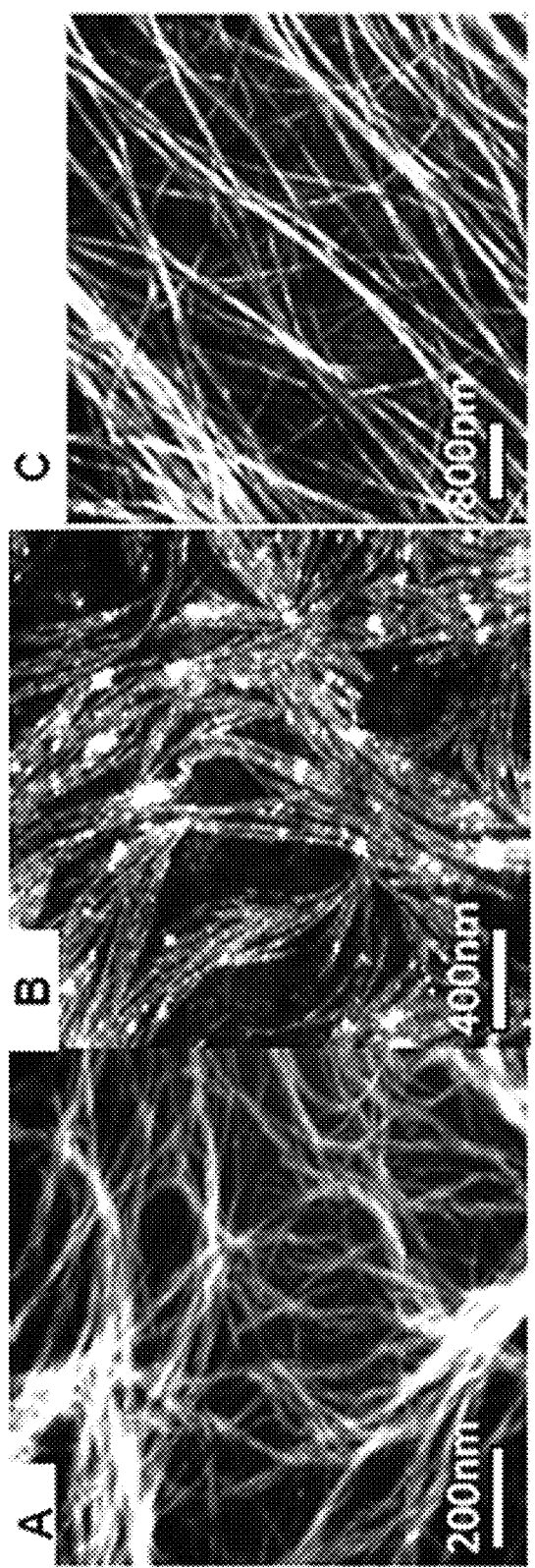
FIG. 12. AFM images of (A) monomer 2, (B) the C-Polymer, and (C) the hybrid CNC polymer obtained by simultaneous polymerizations.
Figure 13:
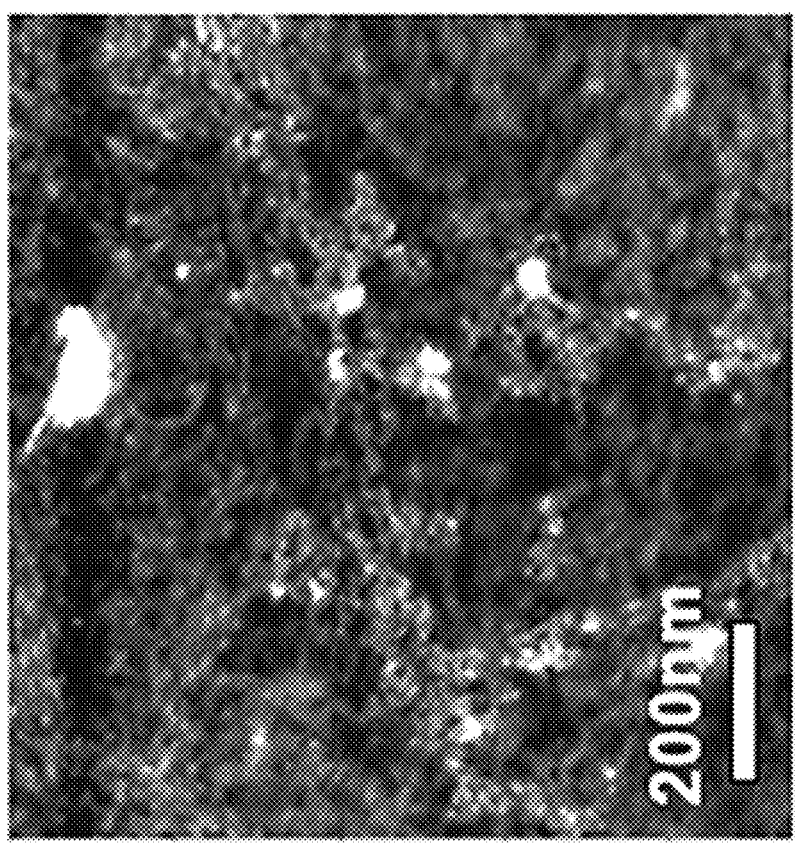
FIG. 13. AFM image for monomer 1, where no specific ordered structures were observed.
Figure 14:
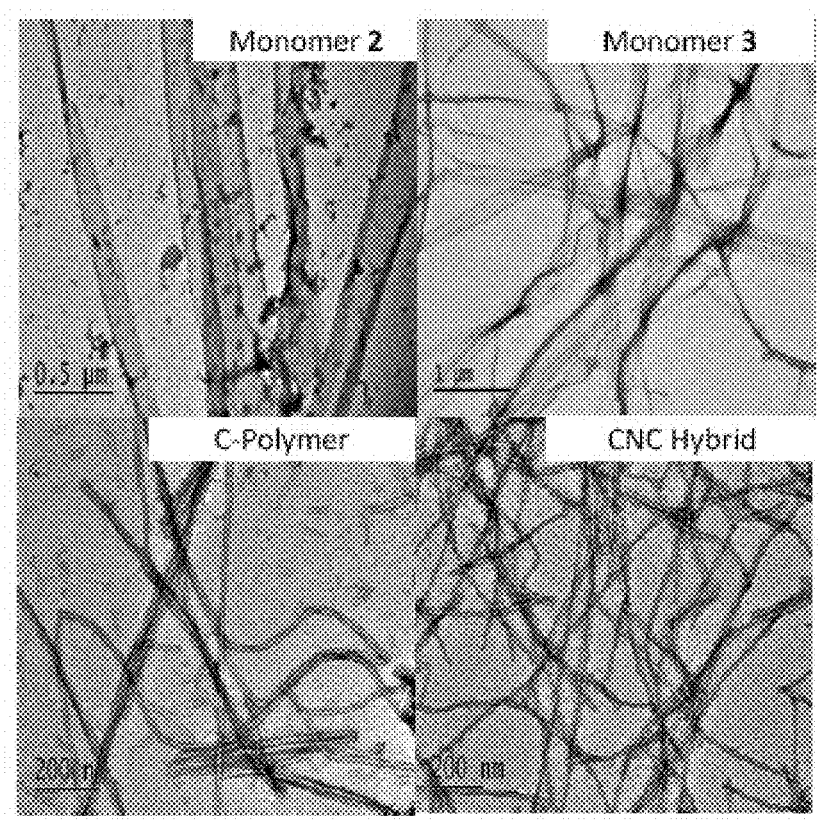
FIG. 14. Conventional TEM images of monomers 2, 3, the C-Polymer and the hybrid CNC polymer. All images were taken from solutions dried and stained with uranyl acetate (1%).
Figure 15:
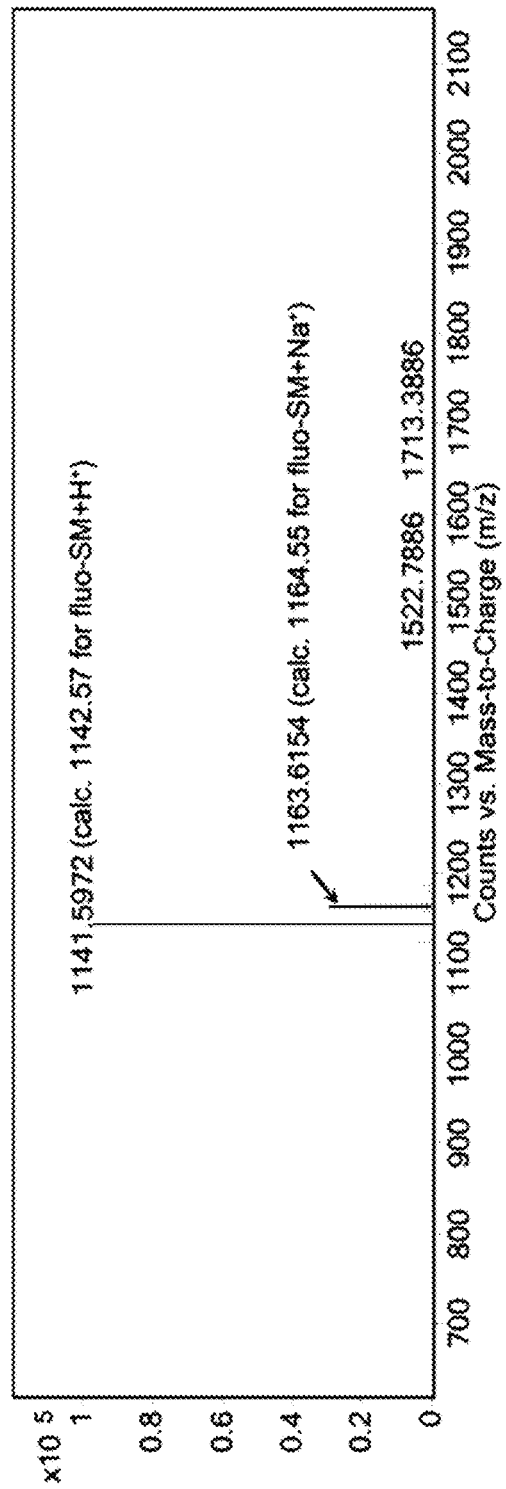
FIG. 15. ESI-MS spectra of monomer fl-3.

AFM experiments showed that monomer 2 formed twisted ribbons on mica (FIG. 12A). No ordered structures were observed for monomer 1 (FIG. 13) (ref. 18; herein incorporated by reference in its entirety), indicating inhibition of the π-π stacking interactions as well as the hydrogen bonding among monomers of monomer 1. The mixture of monomers 1 and 2 formed fibrous structures approximately 2 nm in diameter (FIG. 12B). 18 In great contrast, when all three monomers (1, 2, and 3) are mixed simultaneously, we observed the formation of extremely well-defined fibers very different from those observed in experiments in which only monomers 1 and 2 were mixed (FIGS. 12B and C). This observation indicates that monomer 3 was integrated with the C-Polymer, resulting in novel hybrid CNC polymer in which one could expect the presence of distinct covalent and supramolecular compartments, rather than supramolecular block polymers.

Example 5

Reconstitution of the Hybrid CNC Polymers Involving a Fluorescein-Labeled SM The dissociation of monomer 3 (containing 1% fl-3) from the dynamer was carried out as the same process for the samples for MALDI-TOF and SEC-MALS. After lyophilization, the slight change of the concentration of monomer 3 induced by the different solution volumes was considered during the quantitative determination of the fluorescence intensity of fl-3.

Example 6

Figure 16:
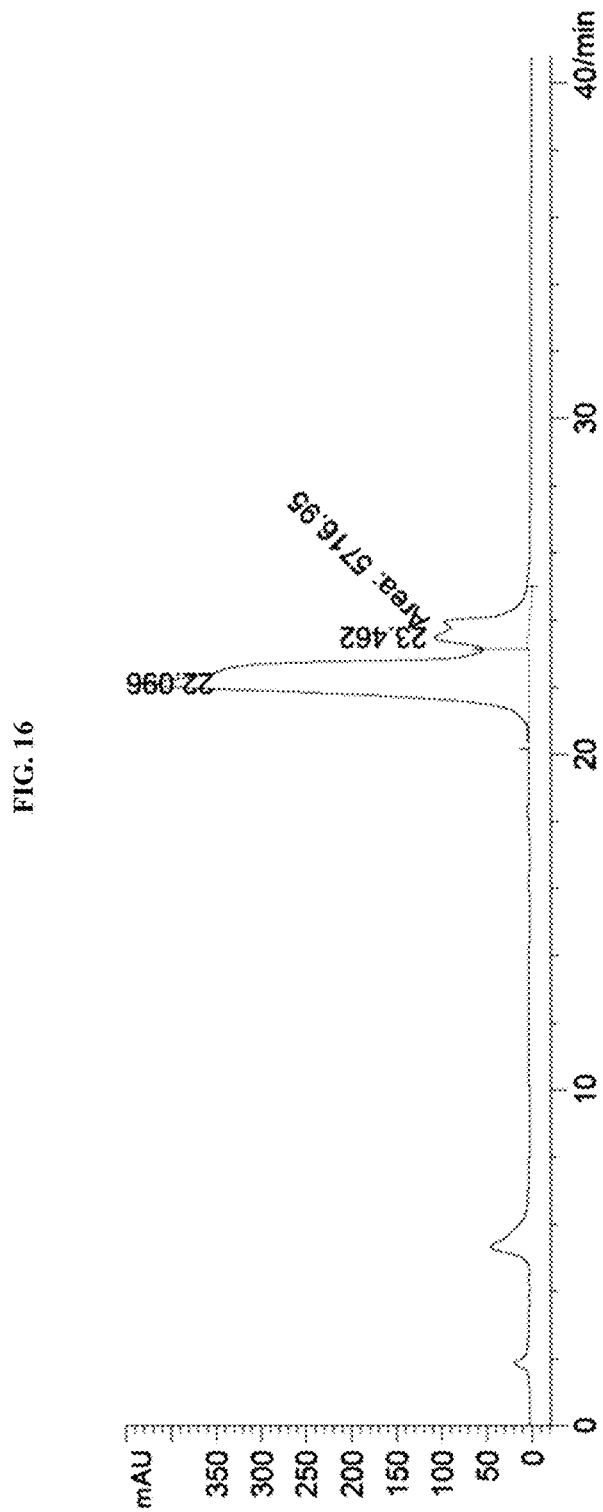
FIG. 16. HPLC trace of monomer fl-3.

Molecular Dynamic Simulation of Covalent and Non-Covalent Interactions within C12Polymer and the Hybrid CNC Polymer Atomistic structures of the initial C-Polymer and hybrid CNC-polymer nanofibers are shown in FIG. 16. As displayed in FIG. 16A, the C-Polymer fiber structure contained 16 layers of the unit, which was made by two copies of monomer 1 connected with one molecule of monomer 2, as defined in FIG. 1. The separation between each layer is around 7 Å. The starting structure of the hybrid CNC-polymer fiber (FIG. 16B) was constructed by filling two molecules of monomer 3 (labeled in red) between two neighboring peptide segments of monomer 1 and/or 2. This ratio between monomer 3 and the C-Polymer was determined by CD experiments. For 16 layers of C-Polymer structure, 96 copies of monomer 3 were employed to build up the hybrid CNC polymer for the MD simulations.

All the molecular dynamics (MD) simulations depicted in this section were carried out using NAMD2.9.5 In the first step of the MD simulations, 2 ns NVT-ensemble simulations were employed to equilibrate the initial structure of the C-Polymer and hybrid CNC-polymer nanofibers in the vacuum environment using the simulation box with the dimension of 86×86×140 Å. In the second simulation step, 10 ns NPT-ensemble simulations were applied to further equilibrate the structures of the C-Polymer and hybrid CNC-polymer nanofibers in the vacuum environment. The last step of the simulations was carried out as the following. First, the pre-equilibrated structures of the C-Polymer and hybrid CNC-polymer obtained by the previous NPT-simulation step in vacuum were put into the water box with the dimension 80×80×60 Å and 90×90×110 Å, respectively. For the C-Polymer system, 8072 TIP3P water were used in the box and additional 64 sodium ions were added to neutralize the system. For CNC-polymer system, 20341 TIP3P water and 190 sodium ions were used. The two systems were re-equilibrated for 5 ns in the solvent environment with NPT ensemble, and then were simulated for the other 20 ns in the product period to collect the frames for the results analysis. The force field parameters for the structures were obtained from the CHARMM force field (ref. 30; herein incorporated by reference in its entirety). In the simulations, full electrostatics was employed using the particle-mesh Ewald method with a 1 Å grid width.7 The nonbonded interactions were calculated using a group-based cutoff with a switching function and were updated every 10 time steps. Covalent bonds involving hydrogen were held rigid using the SHAKE algorithm (ref. 32), allowing a 2 fs time step. The simulations were carried out at constant temperature (300 K) using Langevin dynamics9 with a damping coefficient g=5 ps-1. Pressure was maintained at 1 atm using the Langevin piston method (refs. 33,34' herein incorporated by reference in their entireties) with a piston period of 100 fs, a damping time constant of 50 fs, and a piston temperature of 300 K.

The lengths of the formed fibers for the hybrid and C-Polymer were found to be 13 nm and 7 nm, respectively, whereas the diameters of these fibers were 7 nm and 5 nm. β-sheets were formed among 15 peptide segments within the C-Polymer and among 22 peptide segments in the hybrid CNC polymer. Within the hybrids, 17 out of 22 β-sheets were formed between the supramolecular and covalent compartments.

All publications and patents mentioned in the present application and/or listed below are herein incorporated by reference. Various modification, recombination, and variation of the described features and embodiments will be apparent to those skilled in the art without departing from the scope and spirit of the invention. Although specific embodiments have been described, it should be understood that the invention as claimed should not be unduly limited to such specific embodiments. Indeed, various modifications of the described modes and embodiments that are obvious to those skilled in the relevant fields are intended to be within the scope of the following claims.

REFERENCES

The following reference, some of which are cited above by number (e.g., (ref. X; herein incorporated by reference in its entirety)), are herein incorporated by reference in their entireties.

(1) Stupp, S. I.; LeBonheur, V.; Walker, K.; Li, L. S.; Huggins, K. E.; Keser, M.; Amstutz, A. Supramolecular materials: Self-organized nanostructures. *Science* 1997, 276, 384-389.
(2) Aida, T.; Meijer, E. W.; Stupp, S. I. Functional Supramolecular Polymers. *Science* 2012, 335, 813-817.
(3) Silva, G. A.; Czeisler, C.; Niece, K. L.; Beniash, E.; Harrington, D. A.; Kessler, J. A.; Stupp, S. I. Selective Differentiation of Neural Progenitor Cells by High-Epitope Density Nanofibers. *Science* 2004, 303, 1352-1355.
(4) Huang, Z.; Kang, S.-K.; Banno, M.; Yamaguchi, T.; Lee, D.; Seok, C.; Yashima, E.; Lee, M. Pulsating Tubules from Noncovalent Macrocycles. *Science* 2012, 337, 1521-1526.
(5) Fukino, T.; Joo, H.; Hisada, Y.; Obana, M.; Yamagishi, H.; Hikima, T.; Takata, M.; Fujita, N.; Aida, T. Manipulation of Discrete Nanostructures by Selective Modulation of Noncovalent Forces. *Science* 2014, 344, 499-504.
(6) Ridley, A. J.; Hall, A. The small GTP-binding protein rho regulates the assembly of focal adhesions and actin stress fibers in response to growth factors. *Cell* 1992, 70, 389-399.
(7) Berry, D. A.; Chhabra, D.; Dedova, I. V.; Kekic, M.; Nosworthy, N. J.; Remedios, C. G. D.; Tsubakihara, M. Actin Binding Proteins: Regulation of Cytoskeletal Microfilaments. *Physiol. Rev.*, 2003, 83, p. 433-473.
(8) Jiang, T.; Xu, C.; Liu, Y.; Liu, Z.; Wall, J. S.; Zuo, X.; Lian, T.; Salaita, K.; Ni, C.; Pochan, D.; Conticello, V. P. Structurally Defined Nanoscale Sheets from Self-Assembly of Collagen-Mimetic Peptides. *J. Am. Chem. Soc.* 2014, 136, 4300-4308.
(9) Cui, H.; Cheetham, A. G.; Pashuck, E. T.; Stupp, S. I. Amino Acid Sequence in Constitutionally Isomeric Tetrapeptide Amphiphiles Dictates Architecture of—Dimensional Nanostructures. *J. Am. Chem. Soc.* 2014, 136, 12461-12468.
(10) Carnall, J. M. A.; Waudby, C. A.; Belenguer, A. M.; Stuart, M. C. A.; Peyralans, J. J.-P.; Otto, S. Mechanosensitive Self-Replication Driven by Self-Organization. *Science* 2010, 327, 1502-1506.
(11) Hirst, A. R.; Roy, S.; Arora, M.; Das, A. K.; Hodson, N.; Murray, P.; Marshall, S.; Javid, N.; Sefcik, J.; Boekhoven, J.; van Esch, J. H.; Santabarbara, S.; Hunt, N. T.; Ulijn, R. V. Biocatalytic induction of supramolecular order. *Nat. Chem.* 2010, 2, 1089-1094.
(12) Cui, H.; Muraoka, T.; Cheetham, A. G.; Stupp, S. I. Self-Assembly of Giant Peptide Nanobelts. *Nano Letters* 2009, 9, 945-951.
(13) Hill, D. J.; Mio, M. J.; Prince, R. B.; Hughes, T. S.; Moore, J. S. A Field Guide to Foldamers. *Chem. Revn.* 2001, 101, 3893-4012.
(14) Guichard, G.; Huc, I. Synthetic foldamers. *Chem. Commun.* 2011, 47, 5933-5941.
(15) Godoy-Alcántar, C.; Yatsimirsky, A. K.; Lehn, J. M. Structure-stability correlations for imine formation in aqueous solution. *J. Phys. Org. Chem.* 2005, 18, 979-985.
(16) Prince, R. B.; Saven, J. G.; Wolynes, P. G.; Moore, J. S. Cooperative Conformational Transitions in Phenylene Ethynylene Oligomers: Chain-Length Dependence. *J. Am. Chem. Soc.* 1999, 121, 3114-3121.
(18) Prince, R. B.; Brunsveld, L.; Meijer, E. W.; Moore, J. S. Twist Sense Bias Induced by Chiral Side Chains in Helically Folded Oligomers. *Angew. Chem. Int. Ed.* 2000, 39, 228-230.
(19) Sada, K.; Takeuchi, M.; Fujita, N.; Numata, M.; Shinkai, S. Post-polymerization of preorganized assemblies for creating shape-controlled functional materials. *Chem. Soc. Rev.* 2007, 36, 415-435.
(20) Stupp, S. I.; Son, S.; Lin, H. C.; Li, L. S. Synthesis of Two-Dimensional Polymers. *Science* 1993, 259, 59-63.
(21) Hartgerink, J. D.; Beniash, E.; Stupp, S. I. *Science* 2001, 294, 1684.
(22) Hsu, L.; Cvetanovich, G. L.; Stupp, S. I. Peptide Amphiphile Nanofibers with Conjugated Polydiacetylene Backbones in Their Core. *J. Am. Chem. Soc.* 2008, 130, 3892-3899.
(23) Jin, W.; Fukushima, T.; Kosaka, A.; Niki, M.; Ishii, N.; Aida, T. Controlled Self-Assembly Triggered by Olefin Metathesis: Cross-Linked Graphitic Nanotubes from an Amphiphilic Hexa-peri-hexabenzocoronene. *J. Am. Chem. Soc.* 2005, 127, 8284-8285.
(24) Lee, O. S.; Stupp, S. I.; Schatz, G. C. Atomistic molecular dynamics simulations of peptide amphiphile self-assembly into cylindrical nanofibers. *J. Am. Chem. Soc.* 2011, 133, 3677-3683.
(25) Zhao, D.; Moore, J. S. *J. Am. Chem. Soc.* 2003, 125, 16294.
(26) Prince, R. B.; Saven, J. G.; Wolynes, P. G.; Moore, J. S. *J. Am. Chem. Soc.* 1999, 121, 3114.
(27) Sonnino, S.; Chigorno, V.; Acquotti, D.; Pitto, M.; Kirschner, G.; Tettamantit, G. *Biochemistry* 1989, 28, 77.
(28) Kumar, A.; Meijer, E. W. *Chem. Commun.* 1998, 1629.
(29) Kale, L.; Skeel, R.; Bhandarkar, M.; Brunner, R.; Gursoy, A.; Krawetz, N.; Phillips, J.; Shinozaki, A.; Varadaraj an, K.; Schulten, K. *J. Comp. Phys.* 1999, 151, 283.
(30) MacKerell, Jr., A. D., Bashford, D., Bellott, M., Dunbrack Jr., R. L., Evanseck, J. D., Field, M. J., Fischer, S., Gao, J., Guo, H., Ha, S., Joseph-McCarthy, D., Kuchnir, L., Kuczera, K., Lau, F. T. K., Mattos, C., Michnick, S., Ngo, T., Nguyen, D. T., Prodhom, B., Reiher, III, W. E., Roux, B., Schlenkrich, M., Smith, J. C., Stote, R., Straub, J., Watanabe, M., Wiorkiewicz-Kuczera, J., Yin, D., Karplus, M., *J. Phys. Chem. B* 1998 102, 3586.
(31) Darden, T.; York, D.; Pedersen, L. *J. Chem. Phys.* 1993, 98, 10089.
(32) Andersen, H. C. *J. Comp. Phys.* 1983, 52, 24.
(33) Martyna, G. J.; Tobias, D. J.; Klein, M. L. *J. Chem. Phys.* 1994, 101, 4177.
(34) Feller, S. E.; Zhang, Y. H.; Pastor, R. W.; Brooks, B. R. *J. Chem. Phys.* 1995, 103, 4613.

The invention claimed is:
1. A composition comprising a copolymer of:
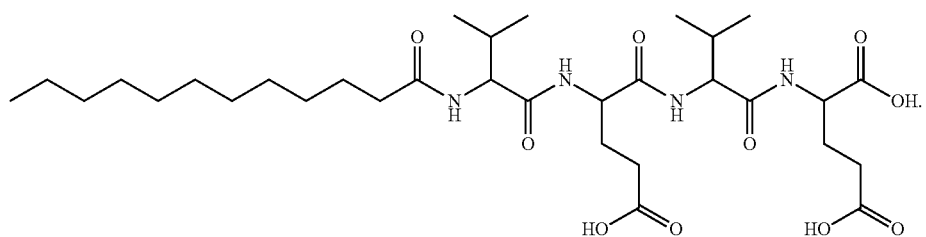 [SMILES: CCCCCCCCCCCC(=O)NC(C(=O)NC(CCC(=O)O)C(=O)NC(C(=O)NC(CCC(=O)O)C(=O)O)C(C)C)C(C)C]
Monomer 1, Monomer 2
2. The composition of claim 1, further comprising:
a supramolecular homopolymer of Monomer 3:
* * * * *